US010638377B2

(12) United States Patent
Futaki et al.

(10) Patent No.: US 10,638,377 B2
(45) Date of Patent: Apr. 28, 2020

(54) BASE STATION APPARATUS FOR DUAL CONNECTIVITY AND METHOD THEREOF

(71) Applicant: NEC Corporation, Tokyo (JP)

(72) Inventors: Hisashi Futaki, Tokyo (JP); Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/741,641

(22) PCT Filed: Jun. 21, 2016

(86) PCT No.: PCT/JP2016/002993
§ 371 (c)(1),
(2) Date: Jan. 3, 2018

(87) PCT Pub. No.: WO2017/022167
PCT Pub. Date: Feb. 9, 2017

(65) Prior Publication Data
US 2018/0199245 A1 Jul. 12, 2018

(30) Foreign Application Priority Data
Jul. 31, 2015 (JP) ................... 2015-152735

(51) Int. Cl.
H04W 72/04 (2009.01)
H04W 36/00 (2009.01)
(Continued)

(52) U.S. Cl.
CPC ....... H04W 36/0033 (2013.01); H04W 16/32 (2013.01); H04W 36/04 (2013.01);
(Continued)

(58) Field of Classification Search
CPC . H04W 36/0033; H04W 36/18; H04W 36/04; H04W 72/0426; H04W 72/04; H04W 92/20; H04W 16/32
See application file for complete search history.

(56) References Cited

U.S. PATENT DOCUMENTS

2015/0111580 A1    4/2015  Wu
2016/0337925 A1*  11/2016  Fujishiro ............... H04W 16/32
(Continued)

FOREIGN PATENT DOCUMENTS

CN         104135772 A       11/2014
EP         2 863 681 A1       4/2015
WO    WO-2014/103145 A1       7/2014

OTHER PUBLICATIONS

International Search Report, Corresponding to PCT/JP2016/002993, dated Aug. 16, 2016, 2 pages.
(Continued)

Primary Examiner — Hassan Kizou
Assistant Examiner — Mahbubul Bar Chowdhury
(74) Attorney, Agent, or Firm — Wilmer Cutler Pickering Hale and Dorr LLP

(57) ABSTRACT

A secondary base station (2) receives an SeNB addition request message (302) from a second master base station (3) while providing a radio terminal (4) with a secondary cell group (SCG) for DC in cooperation with a first master base station (1). If the SeNB addition request message (302) explicitly or implicitly indicates that a master base station in DC for the radio terminal (4) is to be changed from the first master base station (1) to the second master base station (3), the secondary base station (2) considers that the SeNB addition request message (302) requests modification of the SCG that has already been configured. It is thus, for example, possible to contribute to performing a procedure for changing a master base station in Dual Connectivity
(Continued)

(DC) by using existing inter-base station interface procedures and inter-base station signaling messages.

12 Claims, 10 Drawing Sheets

(51) Int. Cl.
*H04W 16/32* (2009.01)
*H04W 36/04* (2009.01)
*H04W 92/20* (2009.01)
*H04W 36/18* (2009.01)

(52) U.S. Cl.
CPC ........... *H04W 36/18* (2013.01); *H04W 72/04* (2013.01); *H04W 72/0426* (2013.01); *H04W 92/20* (2013.01)

(56) References Cited

U.S. PATENT DOCUMENTS

| | | | | |
|---|---|---|---|---|
| 2016/0373972 | A1* | 12/2016 | Vesely | H04W 36/0033 |
| 2017/0134998 | A1* | 5/2017 | Xu | H04W 36/08 |
| 2017/0195935 | A1* | 7/2017 | Xu | H04W 36/08 |
| 2018/0007536 | A1* | 1/2018 | Xu | H04W 8/082 |
| 2018/0027456 | A1* | 1/2018 | Nagasaka | H04W 16/32 370/331 |
| 2018/0035339 | A1* | 2/2018 | Mitsui | H04W 36/08 |

OTHER PUBLICATIONS

3GPP TSG RAN WG3 #87 R3-150219, CATT, "Solutions for Inter-MeNB Handover Without SeNB Change," Feb. 9-13, 2015, Athens, Greece, 5 pp.

3GPP TSG-RAN WG3 Meeting #87 R3-150329, Ericsson, "Analysis of Inter-MeNB Handover Without SeNB Change," Feb. 9-13, 2015, Athens, Greece, 5 pp.

3GPP TSG-RAN WG3 #87 R3-150134, Samsung, "Handover Enhancement," Feb. 9-13, 2015, Athens, Greece, 8 pp.

3GPP TSG-RAN WG3 #87 bis, R3-150627, ZTE, "Further Discussion on the Inter-MenNB Handover Enhancement in Dual Connectivity," Apr. 20-24, 2015, Santa Cruz, Spain, 5 pp.

3GPP TSG RAN WG3 Meeting #89 bis, R3-152215, Kyocera Corp. "Direct Data Forwarding During Inter MeNB Handover Without SeNB Change," Oct. 5-9, 2015, Sophia-Antipolis, Valbonne, France, 5 pp.

3GPP TS 36.300 V12.6.0, Technical Specification,"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)," Jun. 2015, Sophia-Antipolis, Valbonne, France, 254 pp.

3GPP TS 36.423, V12.6.0 Technical Specification, "3rd Generation Partnership Project; Technical Specification Group Radio Access network; Evolved Universal Terrestrial Radio Access Network (E-UTRAN); X2 Application Protocol (X2AP) (Release 12)," Jun. 2015, Sophia-Antipolis, Valbonne, France, 208 pp.

3GPP TR 36.875 V13.0.0 (Jun. 2015) Technical Report, 3rd Generation Partnership Project; Technical Specification Group Radio Access Network; Evolved Universal terrestrial Radio Access Network (E-UTRAN); Extension of dual connectivity in E-UTRAN), Release 13, Jun. 2015 (38 pages).

3GPP TS 36.413 V12.6.0 (Jun. 2015) Technical Specification, 3rd Generation Partnership Project; Technical Specification Group Radio Access Network; Evolved Universal Terrestrial Radio Access Network (E-UTRAN); S1 Application Protocol (S1AP), Release 12, Jun. 2015 (302 pages).

Extended European Search Report issued by the European Patent Office for European Application No. 16832458.0 dated Dec. 4, 2018 (10 pages).

Huawei, "Comparison on SeNB Addition and SeNB Modification," 3GPP TSG RAN WG3 Meeting #87bis, R3-150856, Agenda Item 20.3, Tenerife, Spain, Apr. 20-24, 2015 (5 pages).

Huawei, "Introduction of SeNB Addition Preparation Procedure," 3GPP TSG-RAN3 Meeting #84, R3-141066, Change Request, Seoul, Korea, May 19-23, 2014 (8 pages).

Kyocera Corp., "Analysis of FFSs for inter MeNB handover," 3GPP TSG RAN WG3 Meeting #87bis, R3-150801, Agenda Item 20.3, Santa Cruz, Spain, Apr. 20-24, 2015 (7 pages).

Nokia Networks, "Open issue resolution for handover enhancement," 3GPP TSG-RAn WG3 Meeting #87bis, R3-150525, Agenda Item 20.3, Santa Cruz, Tenerife, Spain, Apr. 20-24, 2015 (9 pages).

Korean Notice of Grounds for Rejection issued in Korean Patent Application No. 10-2018-7003112, dated Sep. 26, 2019, 7 pages.

Ericsson "Establishing the Target Side X2 Signalling Connection during Optimised Inter-MeNB Handover without SeNB Change", 3GPP TSG-RANWG3 Meeting #87bis, R3-150746, Tenerife—Santa Cruz, Apr. 20-24, 2015, pp. 1-6 (6 pages).

ZTE "Discussion on the Need of Identity Information in the Inter-MeNB Handover without SeNB Change", 3GPP TSG-RAN WG3 #88, R3-151145, Fukuoka, Japan, May 25-29, 2015, 5 pages.

Chinese Notification of First Office Action issued in Chinese Patent Application No. 201680045190.6, dated Feb. 3, 2020, 19 pages.

\* cited by examiner

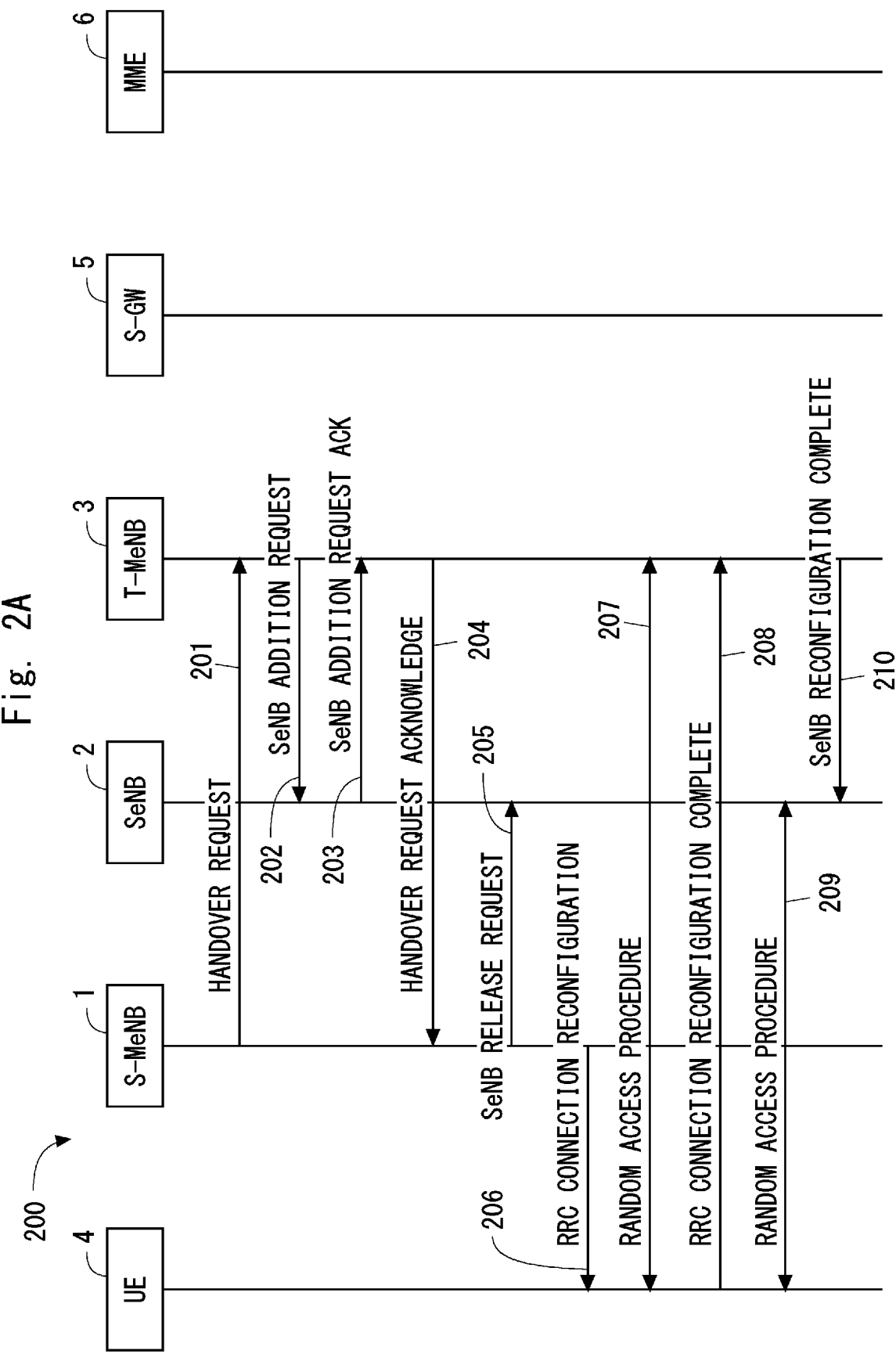

BASE STATION APPARATUS FOR DUAL CONNECTIVITY AND METHOD THEREOF

CROSS-REFERENCE TO RELATED APPLICATIONS

The present application is a national stage application of International Application No. PCT/JP2016/002993 entitled "Base Station Device and Method Thereof," filed on Jun. 21, 2016, which claims the benefit of priority from Japanese Patent Application No. JP2015-152735, filed on Jul. 31, 2015, the disclosure of which is incorporated herein in its entirety by reference thereto.

TECHNICAL FIELD

The present disclosure relates to a radio communication network and, in particular, to Dual Connectivity (DC).

BACKGROUND ART

The 3GPP Release 12 specifications define Dual Connectivity (DC) (see, for example, Non Patent Literature 1 and 2). DC is similar to but different from Coordinated Multipoint (CoMP) introduced in the 3GPP Release 11 specifications. In particular, in DC, different carrier frequencies are used for a macro cell and a small cell (picocell), a radio terminal (i.e., User Equipment (UE)) executes two Medium Access Control (MAC) entities (that is, the UE uses radio resources provided by two independent schedulers, one of which is in a master base station (i.e., Master eNodeB (MeNB)) and the other is in a secondary base station (i.e., Secondary eNB (SeNB))), and the UE needs to support simultaneous use of at least two UL carriers.

In DC of 3GPP Release 12, the UE is connected to one MeNB and one SeNB. The UE configured with DC (DC UE) uses two MAC entities and at least two Radio Link Control (RLC) entities for respective data flows on the MeNB and the SeNB. The MeNB in DC is an eNB that terminates S1-MME for the DC UE. The SeNB in DC provides additional radio resources for the DC UE. One or more serving cells provided for the UE by the MeNB are referred to as a Master Cell Group (MCG), and one or more serving cells provided for the UE by the SeNB are referred to as a Secondary Cell Group (SCG). The MCG is one or more serving cells associated with the MeNB and includes a Primary Cell (PCell) and optionally one or more Secondary Cells (SCells). The SCG is composed of one or more serving cells associated with the SeNB and includes a Primary Secondary Cell (PSCell) and optionally one or more Secondary Cells (SCells). In DC of 3GPP Release 12, the PSCell is a special cell in the SCG and is different from a normal SCell in that the PSCell is configured with the uplink (i.e., PUCCH) for the UE.

In the control plane architecture for DC, there is only one S1-MME per DC UE. The S1-MME is defined between the MeNB and a Mobility Management Entity (MME), and the MeNB terminates the S1-MME. The signaling between the MeNB and the SeNB regarding the DC UE is performed using a signaling interface (i.e., X2-C) between the eNBs.

For DC, two user plane architectures are allowed. In the one architecture, S1-U is only terminated in the MeNB and the MeNB forwards user plane data to the SeNB using X2-U. In the other architecture, S1-U can also be terminated in the SeNB.

Accordingly, three types of radio bearers, i.e., MCG bearer, split bearer, and SCG bearer, are defined for DC. Regarding the MCG bearer, the MeNB terminates an S1-U connection with a Serving Gateway (S-GW), and Radio protocols of the MCG bearer are only located in the MeNB to use MeNB resources. Thus, the SeNB is not involved in transferring user plane data of the MCG bearer on the Uu interface.

Regarding the split bearer, the MeNB terminates an S1-U connection with an S-GW, and Packet Data Convergence Protocol (PDCP) data (i.e., PDCP Protocol Data Unit (PDCP PDU)) is transferred between the MeNB and the SeNB. Thus, both the MeNB and the SeNB are involved in transferring user plane data of the split bearer on the Uu interface.

Regarding the SeNB bearer, the SeNB terminates an S1-U connection with an S-GW, and Radio protocols of the SeNB bearer are only located in the SeNB to use SeNB resources. Thus, the MeNB is not involved in transferring user plane data of the SCG bearer on the Uu interface.

Some overall procedures regarding DC are defined in Non Patent Literature 1 (see, for example, Section 10.1.2.8 of Non Patent Literature 1).

SeNB Addition Procedure

This procedure is initiated by the MeNB to establish a UE context at the SeNB. This procedure is used to add at least the first cell (i.e., PSCell) of the SCG. In this procedure, there is always at least one bearer (split bearer or SCG bearer) configured in the SCG.

SeNB Modification Procedure

This procedure is used to modify the SCG in the SeNB and is initiated by the MeNB or the SeNB. This procedure is used to modify, establish or release bearer contexts, to transfer bearer contexts to and from the SeNB, or to modify other properties of the UE context within the same SeNB. The MeNB uses this procedure to add or release SCG SCells, SCG bearer(s), and the SCG part of split bearer(s). The MeNB also uses this procedure to trigger PSCell change involving PSCell release.

SeNB Release Procedure

This procedure is initiated by the MeNB or the SeNB and is used to initiate the release of the UE context at the SeNB.
Intra-MeNB Change Procedure
This procedure is used to perform handover within the same MeNB while keeping the SCG in the same SeNB.

SeNB Change Procedure

This procedure is used to change the SCG between SeNBs (inter-SeNB). This procedure is initiated by the MeNB and used to transfer a UE context from a source SeNB to a target SeNB and to change the SCG configuration in the UE from one SeNB to another SeNB. This procedure is basically implemented by a combination of the SeNB Addition procedure and the SeNB Release procedure.

MeNB to eNB Change Procedure

This procedure is initiated by the MeNB. This procedure is used to transfer context data from a source MeNB and a source SeNB to a target eNB.

Signaling and transferring of user plane data between the MeNB and the SeNB in DC are performed through the X2 interface. Accordingly, the following X2 procedures for DC are defined (see, for example, sections 8.6 and 9.1.3 of Non Patent Literature 2). Some of the above-described overall procedures use these X2 procedures for DC.

SeNB Addition Preparation procedure
MeNB initiated SeNB Modification Preparation procedure
SeNB initiated SeNB Modification procedure
MeNB initiated SeNB Release procedure
SeNB initiated SeNB Release procedure In 3GPP Release 12, when a UE is handed over from the MeNB to another eNB (target eNB), the above-described MeNB to eNB Change procedure is used. In this procedure, the SeNB (SCG) is completely released. Therefore, when the SCG is needed after the handover, the target eNB should perform the SeNB Addition procedure again after the completion of the handover. That is, the MeNB to eNB Change procedure requires, in addition to a normal handover procedure, signaling similar to the SeNB Change procedure (i.e., a combination of the SeNB Release procedure and the SeNB Addition procedure). Further, regarding the SCG bearer, data forwarding from the SeNB to the source MeNB and data forwarding from the source MeNB to the target eNB need to be performed.

In 3GPP Release 13, support of an Inter-MeNB handover from the source MeNB to the target MeNB without SeNB change, or support of an Inter-MeNB handover involving the SeNB Addition procedure, is being discussed. When these procedures are supported, the target eNB may not need to perform the SeNB Addition procedure to configure the SCG again at the SeNB. In addition, data forwarding regarding the SCG bearer from the SeNB to the source MeNB and from the source MeNB to the target eNB may become unnecessary.

Patent Literature 1 also discloses some procedures for a handover of a radio terminal from a first master base station to a second master base station during Dual Connectivity. In one of the procedures disclosed in Patent Literature 1, when a radio terminal in Dual Connectivity is handed over from the first master base station to the second master base station, the first master base station requests a secondary base station to suspend providing services in a SCell, and then the secondary base station suspends providing the services in the SCell and keeps communication status information about the SCell. Further, in this procedure, the second master base station sends an instruction to resume communication to the secondary base station after the handover and, in response to the instruction, the secondary base station resumes the services in the SCell based on the communication status information about the SCell, which is kept in the secondary base station. The communication status information about the SCell includes, for example, at least one of (a) transmission or reception status of user data (User Plane (U-plane)), (b) service information, (c) bearer information, and (d) radio resource configuration information.

CITATION LIST

Patent Literature

Patent Literature 1: International Patent Publication No. WO 2014/103145

Non Patent Literature

Non Patent Literature 1: 3GPP TS 36.300 V12.6.0 (2015-06), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", June 2015 Non Patent Literature 2: 3GPP TS 36.423 V12.6.0 (2015-06), "3rd Generation Partnership Project; Technical Specification Group Radio Access Network; Evolved Universal Terrestrial Radio Access Network (E-UTRAN); X2 application protocol (X2AP) (Release 12)", June 2015

SUMMARY OF INVENTION

Technical Problem

It is preferable that MeNB change (or Inter-MeNB handover) from a first MeNB to a second MeNB without SeNB change, or MeNB change (or Inter-MeNB handover) involving SeNB Addition, is implemented using the existing X2 procedures and X2 messages regarding DC defined in the 3GPP Release 12 specifications. In these MeNB change procedures, however, the SeNB is required to perform operations different from those in the SeNB Addition and SeNB Release procedures of 3GPP Release 12.

One of objects to be attained by embodiments disclosed in the present specification is to provide an apparatus, a method, and a program that contribute to performing, while providing Dual Connectivity to a radio terminal (UE), a master base station (MeNB) change procedure without the release of a secondary base station (SeNB), or a master base station (MeNB) change procedure involving the addition of a secondary base station (SeNB), by using existing inter-base station interface (X2 interface) procedures and inter-base station signaling messages (X2 messages). Note that this object is only one of the objects to be attained by the embodiments disclosed herein. Other objects or problems and novel features will become apparent from the following descriptions in the specification and the accompanying drawings.

Solution to Problem

In a first aspect, a base station apparatus includes at least one radio transceiver and at least one processor coupled to the at least one radio transceiver. The at least one processor is configured to, upon receiving an SeNB addition request message from a second master base station while the base station apparatus provides a radio terminal with a secondary cell group (SCG) for dual connectivity in cooperation with a first master base station, if the SeNB addition request message includes a first information element explicitly or implicitly indicating that a master base station in the dual connectivity for the radio terminal is to be changed from the first master base station to the second master base station, consider that the SeNB addition request message requests modification of a configuration regarding the SCG.

In a second aspect, a method in a secondary base station includes:

(a) receiving an SeNB addition request message from a second master base station while providing a radio terminal with a secondary cell group (SCG) for dual connectivity in cooperation with a first master base station; and (b) if the SeNB addition request message includes a first information element explicitly or implicitly indicating that a master base station in the dual connectivity for the radio terminal is to be changed from the first master base station to the second master base station, considering that the SeNB addition request message requests modification of a configuration regarding the SCG.

In a third aspect, a program includes instructions (software codes) that, when loaded into a computer, causes the computer to perform the method according to the second aspect described above.

In a fourth aspect, a radio terminal includes: at least one radio transceiver to communicate with a first master base station, a second master base station, and a secondary base station; and at least one processor. The secondary base station is configured to, upon receiving an SeNB addition request message from the second master base station while providing the radio terminal with a secondary cell group (SCG) for dual connectivity in cooperation with the first master base station, if the SeNB addition request message includes a first information element explicitly or implicitly indicating that a master base station in the dual connectivity for the radio terminal is to be changed from the first master base station to the second master base station, consider that the SeNB addition request message requests modification of a configuration regarding the SCG. The at least one processor is configured to communicate with the first master base station and the second master base station and to change the master base station in the dual connectivity from the first master base station to the second master base station while keeping a connection to the SCG in the secondary base station.

Advantageous Effects of Invention

According to the above aspects, it is possible to provide an apparatus, a method, and a program that contribute to performing, while providing Dual Connectivity to a radio terminal (UE), a master base station (MeNB) change procedure without involving the release of a secondary base station (SeNB), or a master base station (MeNB) change procedure involving the addition of a secondary base station (SeNB), by using existing inter-base station interface (X2 interface) procedures and inter-base station signaling messages (X2 messages).

BRIEF DESCRIPTION OF DRAWINGS

FIG. 2A is a sequence diagram showing an example of an overall procedure of MeNB change (inter-MeNB handover) according to some embodiments;

DESCRIPTION OF EMBODIMENTS

Hereinafter, specific embodiments will be described in detail with reference to the drawings. The same or corresponding elements are denoted by the same reference signs throughout the drawings, and repeated descriptions will be omitted as necessary for the sake of clarity.

The following descriptions on the embodiments mainly focus on an Evolved Packet System (EPS) accommodating LTE and SAE (System Architecture Evolution). However, these embodiments are not limited to the EPS and may be applied to other mobile communication networks or systems such as 3GPP UMTS, 3GPP2 CDMA 2000 system (1×RTT, High Rate Packet Data (HRPD), global system for mobile communications (GSM (registered trademark))/General packet radio service (GPRS), and WiMAX system.

Figure 1:
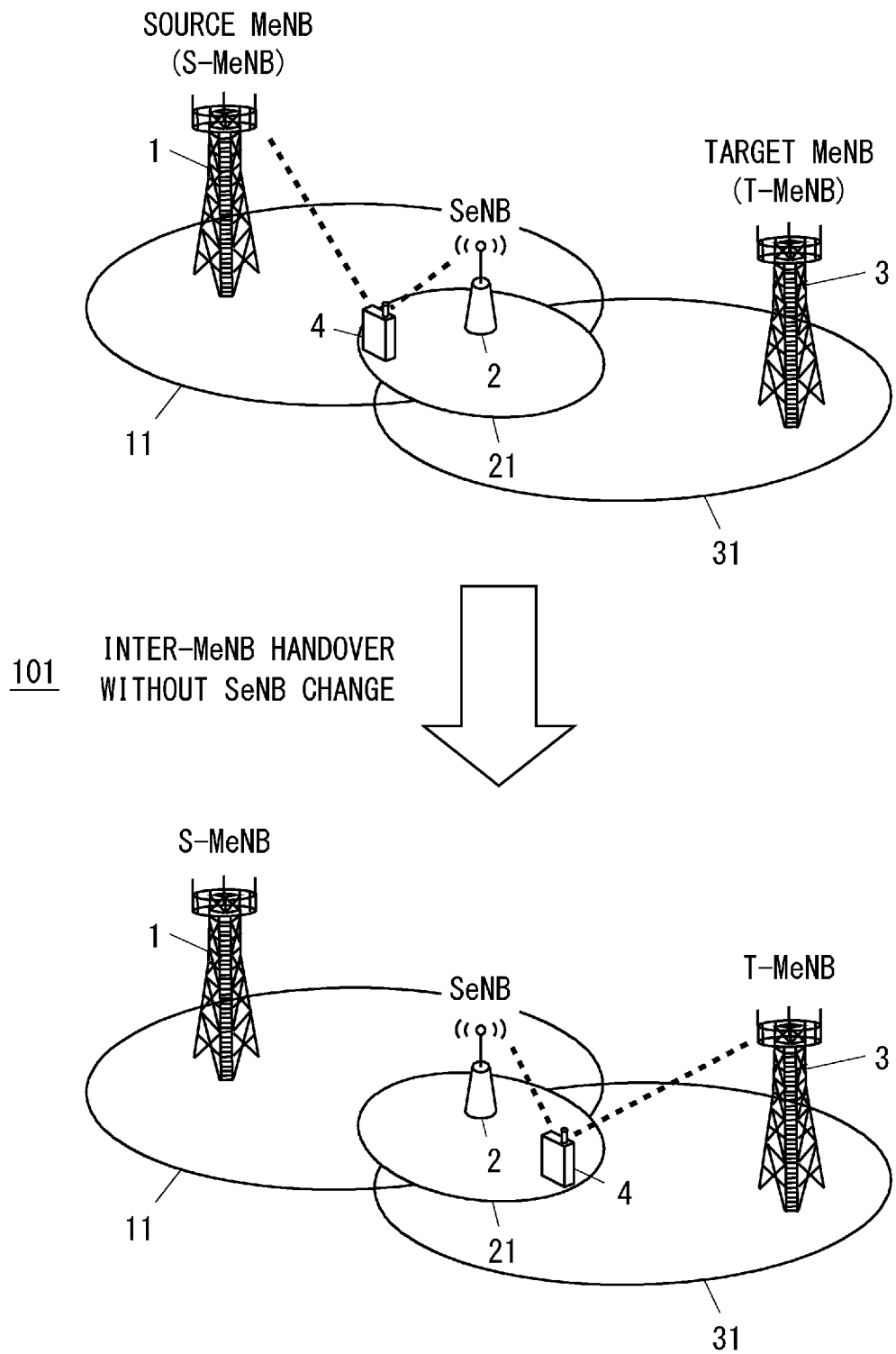
FIG. 1 is a diagram illustrating a configuration example of a radio communication network according to some embodiments.

FIG. 1 shows a configuration example of a radio communication network according to some embodiments. In the example of FIG. 1, the radio communication network includes a base station (eNB) 1, a base station (eNB) 2, a base station (eNB) 3, and a radio terminal (UE) 4. The eNB 1 and eNB 2 serve respectively as an MeNB and an SeNB for Dual Connectivity (DC) to the UE 4. The UE 4 is configured with DC by the MeNB 1 and simultaneously uses an MCG including a cell 11 provided by the MeNB 1 and an SCG including a cell 21 provided by the SeNB 2.

As shown in FIG. 1, some embodiments provides MeNB change 101 in which, while the SeNB 2 provides an SCG for DC to the UE 4 in cooperation with the eNB (MeNB) 1, the MeNB in DC for the UE 1 is changed from the eNB 1 to the eNB 3. After the MeNB change, the UE 4 is configured with DC by the MeNB 3 and simultaneously uses an MCG including a cell 31 provided by the MeNB 3 and an SCG including the cell 21 provided by the SeNB 2. This MeNB change may also be referred to as an inter-MeNB handover. Hereinafter, the eNB 1, which is the MeNB before the MeNB change (or inter-MeNB handover), is referred to as a source MeNB (S-MeNB) and eNB 3, which is the MeNB after the MeNB change (or inter-MeNB handover), is referred to as a target MeNB (T-MeNB).

Each of the eNBs 1 to 3 shown in FIG. 1 may be a Baseband Unit (BBU) used in the Centralized Radio Access Network (C-RAN) architecture. In other words, each eNB shown in FIG. 1 may be a RAN node to be connected to one or more Remote Radio Heads (RRHs). In some implementations, each of the eNBs 1 to 3, which is a BBU, is in charge of control-plane processing and digital baseband signal processing for the user plane. On the other hand, each RRH is in charge of analog Radio Frequency (RF) signal processing (e.g., frequency conversion and signal amplification). The C-RAN is also referred to as a Cloud RAN. The BBU is also referred to as a Radio Equipment Controller (REC) or a Data Unit (DU). The RRH is also referred to as Radio Equipment (RE), a Radio Unit (RU), or a Remote Radio Unit (RRU).

Figure 2B:
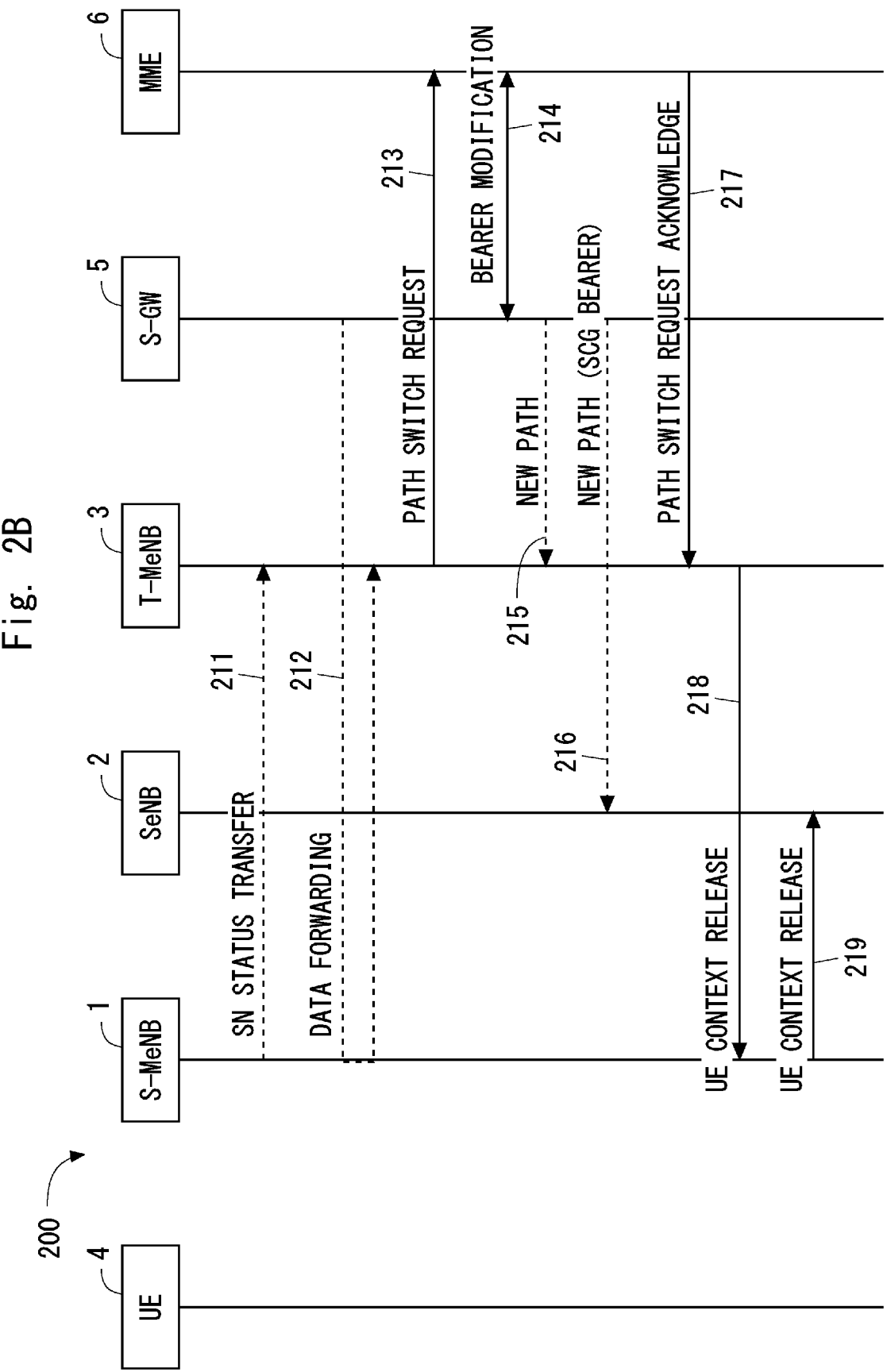
FIG. 2B is a sequence diagram showing an example of an overall procedure of MeNB change (inter-MeNB handover) according to some embodiments.

FIGS. 2A and 2B show an example (procedure 200) of an overall procedure of an MeNB change (or inter-MeNB handover) according to some embodiments. As described later, the inter-MeNB handover procedure 200 contains a procedure corresponding to the SeNB Addition procedure of 3GPP Release 12 (i.e., Steps 202 and 203). That is, the procedure 200 is an MeNB change (or inter-MeNB handover) procedure involving the addition of an SeNB while Dual Connectivity is provided to the UE 4. In other words, the procedure 200 is an MeNB change (or inter-MeNB handover) procedure without involving the release of the SeNB 2 while Dual Connectivity is provided to the UE 4.

In Step 201, the S-MeNB 1 requests the T-MeNB 3 to perform an inter-MeNB handover of the UE 4. The handover request message in Step 201 may also be referred to as an MeNB change request message.

In Step 202, in response to receiving the handover request message in Step 201, the T-MeNB 3 sends an SeNB addition request message to the SeNB 2. The SeNB addition request message may be referred to as an SCG addition request message. The SeNB Addition Request message indicates characteristics of a radio access bearer(s) (i.e., E-UTRAN Radio Access Bearer(s) (E-RAB(s))) and requests the SeNB 2 to allocate radio resources for the specific E-RAB(s). The characteristics of the E-RAB(s) indicate, for example, an E-RAB identifier (E-RAB ID) and a bearer type (i.e., SCG bearer or split bearer). The bearer type is also referred to as a DRB type. The SeNB Addition Request message may further include information needed for SCG configuration (SCG-ConfigInfo) containing an MCG Configuration and UE capabilities.

In response to receiving the SeNB Addition Request message from the T-MeNB 3, the SeNB 2 prepares radio resources and control-plane (C-plane) resources and prepares transport network resources regarding the SCG bearer. The SeNB 2 then sends a response message (i.e., SeNB Addition Request Acknowledge) containing the SCG configuration (SCG-Config) to the T-MeNB 3 (Step 203). The SCG-Config may include a RadioResourceConfigDedicatedSCG IE containing, for example, a pSCellToAddMod IE.

In Step 204, the T-MeNB 3 sends, to the S-MeNB 1, a response message (i.e., Handover Request Acknowledge) indicating acceptance of the handover request. In Step 205, in response to receiving the Handover Request Acknowledge message, the S-MeNB 1 sends an SeNB Release Request message to the SeNB 2. The SeNB Release Request message may be referred to as an SCG Release Request message.

In Step 206, the S-MeNB 1 requests the UE 4, in the PCell (e.g., the cell 11) in the MCG, to reconfigure the Radio Resource Control (RRC) connection. The RRC Connection Reconfiguration message in Step 206 includes: mobility control information (Mobility Control Info) and MCG configuration regarding the T-MeNB 3; and configuration information regarding the SCG in the SeNB 2 (SCG Configuration, i.e., scg-ConfigPartMCG (e.g., scg-Counter) and scg-ConfigPartSCG). In this way, the UE 4 considers that it has been instructed to perform an Inter-eNB Handover to change the master base station in DC from the S-MeNB 1 to the T-MeNB 3 while keeping the connection (i.e., at least one bearer (SCG bearer or Split bearer)) to the SCG in the SeNB 2. For example, upon receiving the RRC Connection Reconfiguration message, the UE 4 resets the MAC entity for the MCG (MCG MAC) and the MAC entity for the SCG (SCG MAC). The UE 4 then reestablishes the PDCP entity for the MCG (MCG PDCP) and, in the case of the SCG bearer, also reestablishes the PDCP entity for the SCG (SCG PDCP). After that, the UE 4 reestablishes the RLC entity for the MCG (MCG RLC) and the RLC entity for the SCG (SCG RLC).

In Steps 207 and 208, the UE 4 performs a random access procedure to acquire synchronization with the T-MeNB 3 and then transmits, to the T-MeNB 3, an RRC Connection Reconfiguration Complete message to notify the T-MeNB 3 of the completion of the RRC reconfiguration including a handover confirm and modification (or change) of the MCG and SCG configurations.

In Step 209, the UE 4 performs a random access procedure to acquire synchronization with the SeNB 2 in accordance with the new SCG configuration (including Mobility Control InfoSCG) received through the RRC Connection Reconfiguration message in Step 206.

In Step 210, in response to receiving the RRC Connection Reconfiguration message from the UE 4 (Step 208), the T-MeNB 3 informs the SeNB 2 that the SeNB reconfiguration has been completed (SeNB Reconfiguration Complete message).

In Step 211, the S-MeNB 1 sends a report about a data communication status regarding the MCG (i.e., an SN Status Transfer message) to the T-MeNB 3. The SN Status Transfer message includes, for example, numbers regarding a MCG bearer(s) including: an uplink PDCP Sequence Number (SN); an uplink Hyper Frame Number (HFN); a downlink PDCP Sequence Number; and a downlink Hyper Frame Number. The SN Status Transfer message may include a PDCP sequence number and a hyper frame number regarding a split bearer(s). In Step 212, the S-MeNB 1 starts forwarding the buffered downlink user data, which has been received from an S-GW 5, to the T-MeNB 3.

In Step 213, the T-MeNB 3 initiates an S1 path switch procedure. In the S1 path switch procedure of Steps 213 to 217, one or more S1 bearers (215) are configured between the S-GW 5 and the T-MeNB 3 for the MCG bearer(s) (and optionally for the split bearer(s)), and one or more S1 bearers (216) are configured between the S-GW 5 and the SeNB 2 for the SCG bearer(s). If there is no modification of the SCG bearer(s) (E-RAB(s)), the configuration of the S1 bearer(s) (216) between the S-GW 5 and the SeNB 2 may be the same as that before the inter-MeNB handover is initiated. For example, the S1 path switch procedure may be omitted.

In Step 218, the T-MeNB 3 sends a UE Context Release message to the S-MeNB 1 to initiate a UE Context Release procedure. Upon receiving the UE Context Release message (Step 218) from the T-MeNB 3, the S-MeNB 1 is allowed to release the radio resources and C-plane resources associated with the UE context. In Step 219, in response to receiving the UE Context Release message from the T-MeNB 3, the S-MeNB 1 sends an UE Context Release message to the SeNB 2.

Some embodiments will be described below. These embodiments may be used individually, or two or more of the embodiments may be appropriately combined with one another. These embodiments are provided for the purpose of illustration.

First Embodiment

The MeNB change procedure shown in FIGS. 2A and 2B achieves an MeNB change procedure involving the addition of an SeNB (or an MeNB change procedure without involving the release of the SeNB 2) by using the existing SeNB Addition procedure and SeNB release procedure. Therefore, in the procedure shown in FIGS. 2A and 2B, the SeNB 2 has to distinguish the SeNB Addition Request message from the T-MeNB 3 in Step 202 from the existing (or normal) SeNB Addition Request message. This is because the SeNB Addition Request message in Step 202 is used to change the MeNB and MCG, which are associated with the SCG (or E-RAB) that has already been configured in the SeNB 2, from the S-MeNB 1 to the T-MeNB 3. Thus, the SeNB Addition Request message in Step 202 has a different role from the existing (or normal) SeNB Addition Request message.

This embodiment provides specific examples of operations of the S-MeNB 1, SeNB 2, and T-MeNB 3 and message structures to distinguish the SeNB Addition Request message (Step 202) shown in FIG. 2A from the existing (or normal) message.

Figure 3A:
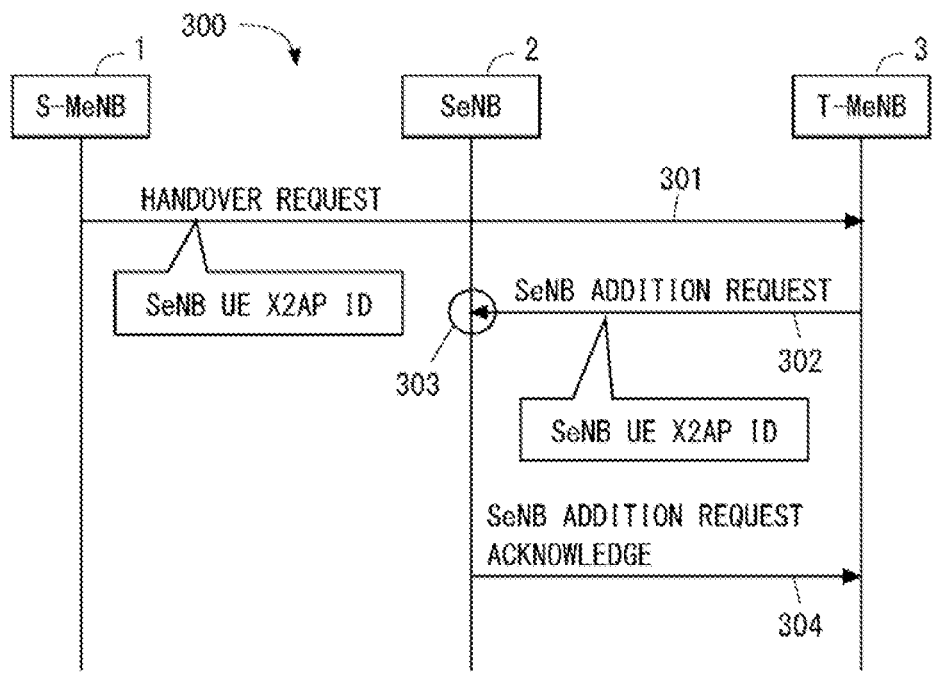
FIGS. 3A and 3B are a sequence diagram for describing an operation of an SeNB according to a first embodiment

FIG. 3 shows an example of a procedure (procedure 300) in which, while providing a specific UE 4 with an SCG for DC in cooperation with the MeNB (S-MeNB) 1, the SeNB 2 receives an SeNB Addition Request message from another eNB (T-MeNB) 3. Steps 301 and 302 shown in FIG. 3 correspond to Steps 201 and 202 shown in FIG. 2A. That is, in Step 301, the S-MeNB 1 sends to the T-MeNB 3 a handover request message to request an inter-MeNB handover of the UE 4. The handover request message includes, for example, the MCG SCG configurations before the handover.

The handover request message (Step 301) further includes one or more additional information elements to explicitly or implicitly indicate from the S-MeNB 1 to the T-MeNB 3 that it is MeNB change involving keeping the SeNB (or the SCG or a bearer(s) in the SCG (SCG bearer or split bearer)). Accordingly, upon receiving the handover request from the S-MeNB 1, the T-MeNB 3 can consider that it has been requested to perform the MeNB change (or inter-MeNB handover) involving keeping the SeNB (or the SCG or a bearer(s) in the SCG (SCG bearer or split bearer)).

In some implementations, as shown in FIG. 3, in order to implicitly indicate the change of the MeNB in DC for the UE 4, the additional information element(s) contained in the handover request message (Step 301) may include a radio terminal identifier (i.e., SeNB UE X2AP ID) that is allocated by the SeNB 2 to uniquely identify the UE 4 on the inter-base station interface (i.e., X2 interface) between the S-MeNB 1 and the SeNB 2. The additional information element(s) may further include the one or more bearer identifiers for the UE 4 (e.g., network-bearer identifier (i.e., E-RAB ID or eps-Bearer Identity), or identifier of Data Radio Bearer (DRB) (i.e., DRB Identity), or a combination thereof) that are already configured in the SeNB 2 for DC in cooperation with the S-MeNB 1.

Additionally or alternatively, in some implementations, in order to implicitly indicate the change of the MeNB in DC for the UE 4, the additional information element(s) contained in the handover request message (Step 301) may include a terminal identifier (e.g., Cell-Radio Network Temporary Identifier (C-RNTI)) allocated to the UE 4 by the SeNB 2 to uniquely identity the UE 4 within the SCG. In this case, the additional information element(s) may further include the one or more bearer identifiers for the UE 4 (e.g., E-RAB ID or eps-Bearer Identity, or DRB Identity, or a combination thereof) that are already configured in the SeNB 2 for DC in cooperation with the S-MeNB 1. In this case, the E-RAB ID may be transmitted as an information element of the X2 message, and meanwhile the eps-Bearer Identity and the DRB Identity may be contained as information elements in the RRC layer within a container (i.e., MeNB to SeNB Container) that is contained in the X2 message.

Additionally or alternatively, in some implementations, the additional information element(s) contained in the handover request message (Step 301) may explicitly indicate that the MeNB in DC for the UE 4 is to be changed from the MeNB (S-MeNB) 1 to the MeNB (T-MeNB) 3. In this case, the additional information element(s) may indicate that there is no change in the bearer identifier(s) for the UE 4 (e.g., E-RAB ID or eps-Bearer Identity, or DRB Identity, or a combination thereof) that are already configured in the SeNB 2 for DC in cooperation with the MeNB 1.

In Step 302, in response to receiving the handover request message in Step 301, the T-MeNB 3 sends an SeNB Addition Request message to the SeNB 2. The SeNB Addition Request message indicates characteristics of a radio access bearer(s) (i.e., E-UTRAN Radio Access Bearer(s) (E-RAB (s))) and requests the SeNB 2 to allocate radio resources for the specific E-RAB(s). The characteristics of the E-RAB(s) indicate, for example, an E-RAB identifier (E-RAB ID) and a bearer type (i.e., SCG bearer or split bearer). The bearer type is also referred to as a DRB type. The SeNB Addition Request message may further include information needed for SCG configuration (SCG-ConfigInfo) containing an MCG Configuration and UE capabilities. Further, the T-MeNB 3 may specify, in the SCG-ConfigInfo, a network-bearer identifier (e.g., eps-Bearer Identity) and a data-radio-bearer identifier (e.g., DRB Identity) that have the same values as those used in DC between the S-MeNB 1 and the SeNB 2. Likewise, the T-MeNB 3 may specify a logical identifier of the cell 21 (e.g., sCellIndex or ServCellIndex) having the same value as that used in DC between the S-MeNB 1 and the SeNB 2.

The SeNB Addition Request message (Step 302) further includes one or more additional information elements to explicitly or implicitly indicate to the SeNB 2 that the MeNB is to be changed from the S-MeNB 1 to the T-MeNB 3 while the SeNB (or the SCG or a bearer(s) for the SCG (SCG bearer or split bearer)) is maintained. The one or more additional information element(s) may be the same as, or may be derived from, the corresponding additional information element(s) included in the handover request message (Step 301).

Specifically, in some implementations, as shown in FIG. 3, in order to implicitly indicate the change of the MeNB in DC for the UE 4, the additional information element(s) contained in the SeNB Addition Request message (Step 302) may include a radio terminal identifier (i.e., SeNB UE X2AP ID) that is allocated by the SeNB 2 to uniquely identity the UE 4 on the inter-base station interface (i.e., X2 interface) between the S-MeNB 1 and the SeNB 2. In this case, the additional information element(s) may further include the one or more bearer identifiers for the UE 4 (e.g., E-RAB ID or eps-Bearer Identity, or DRB Identity, or a combination thereof) that are already configured in the SeNB 2 for DC in cooperation with the S-MeNB 1.

Additionally or alternatively, in some implementations, in order to implicitly indicate the change of the MeNB in DC for the UE 4, the additional information element(s) contained in the SeNB Addition Request message (Step 302) may include a terminal identifier (e.g., C-RNTI) allocated to the UE 4 by the SeNB 2 to uniquely identity the UE 4 within the SCG. In this case, the additional information element(s) may further include the one or more bearer identifiers for the UE 4 (e.g., E-RAB ID or eps-Bearer Identity, or DRB Identity, or a combination thereof) that are already configured in the SeNB 2 for DC in cooperation with the S-MeNB 1.

Additionally or alternatively, in some implementations, the additional information element(s) contained in the SeNB Addition Request message (Step 302) may explicitly indicate that the MeNB in DC for the UE 4 is to be changed from the MeNB (S-MeNB) 1 to the MeNB (T-MeNB) 3. For example, the SeNB Addition Request message may include an SCG Change Indication IE. Further, a new Cause value (e.g., "Inter MeNB Handover" or "SeNB (SCG) Stored Handover") may be defined for the SCG Change Indication IE, and the SeNB Addition Request message may specify this Cause value. Furthermore, in this case, the additional information element(s) may indicate that there is no change in the bearer identifier(s) (e.g., E-RAB ID or eps-Bearer Identity, or DRB Identity, or a combination thereof) for the UE 4 that are already configured in the SeNB 2 for DC in cooperation with the MeNB 1.

In Step 303, the SeNB 2 is configured to, upon receiving the SeNB Addition Request message (Step 302) including the above-described additional information element(s) while providing the specific UE 4 with the SCG for DC in cooperation with the MeNB (S-MeNB) 1, consider that the SeNB Addition Request message requests modification (or change) of the configuration regarding the SCG that has already been configured for the DC in cooperation with the S-MeNB 1. The modification (or change) of the configuration regarding the SCG includes, for example, at least one of: (a) modification (or change) of the configuration of the MeNB associated with the SCG (e.g., MeNB UE X2AP ID); (b) modification (or change) of the configuration of the MCG or MCG bearer(s) associated with the SCG; (c) modification (or change) of an SeNB security key (S-KeNB); and (d) modification (or change) of the configuration of the SCG or SCG bearer(s) or split bearer(s). As a more specific example, if the E-RAB To Be Added List IE contained in the SeNB Addition Request message includes a radio terminal identifier (e.g., SeNB UE X2AP ID) having the same value as that configured for the UE 4 that is currently performing DC with the S-MeNB 1 and also includes an E-RAB ID having the same value as that configured for the UE 4, the SeNB 2 regards this SeNB Addition Request as a request for modification (or change) of the configuration corresponding to this E-RAB or a request for reconfiguration of the SCG including this E-RAB.

In Step 304, the SeNB 2 creates new SCG configuration (SCG-Config) based on the information (e.g., the SCG-ConfigInfo) included in the SeNB Addition Request message (Step 302) from the T-MeNB 3 and transmits a response message (i.e., SeNB Addition Request Acknowledge) containing the new SCG configuration to the T-MeNB 3. The new SCG configuration may include the terminal identifier (C-RNTI) allocated by the SeNB 2 to the UE 4 to uniquely identity the UE 4 within the SCG. The SeNB 2 may always add the C-RNTI to the "MobilityControlInfoSCG" information element in the case of the SCG modification (or change), SCG re-establishment, or SCG relocation (or SCG relocated) due to the MeNB change, in addition to the case of the SCG establishment.

Figure 3B:
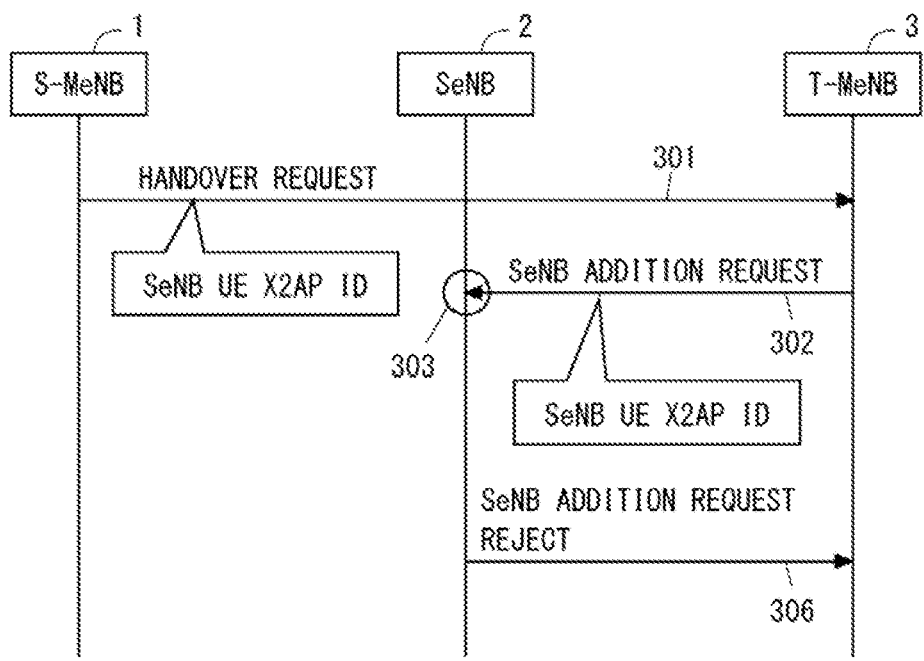

The SeNB 2 and T-MeNB 3 may operate as follows under abnormal conditions regarding the procedure shown in FIG. 3. As shown in FIG. 3B, if the radio terminal identifier (i.e., SeNB UE X2AP ID) indicated by the SeNB Addition Request message (Step 302) is not used to uniquely identify the UE 4 on the inter-base station interface (i.e., X2 interface) between the S-MeNB 1 and the SeNB 2, the SeNB 2 may send an SeNB Addition Request Reject message instead of the SeNB Addition Request Acknowledge message (Step 304). The SeNB Addition Request Reject message indicates that the SeNB Addition Request message (Step 302) cannot be accepted. The SeNB Addition Request Reject message may include a Cause value (e.g., "Inappropriate X2AP ID") indicating that the requested radio terminal identifier (i.e., SeNB UE X2AP ID) is inappropriate. Alternatively, if the SeNB 2 does not support the function required for the inter-eNB handover of the DC UE while the SCG is maintained, the SeNB Addition Request Reject message may include a Cause value (e.g., "Bearer Keeping Option Not Supported" or "Bearer Keeping Handover Not supported") indicating that this function is not supported.

In response to receiving the SeNB Addition Request Reject message, the T-MeNB 3 may send, to the S-MeNB 1, a response message (i.e., Handover Preparation Failure message) indicating that the handover cannot be accepted. Alternatively, the T-MeNB 3 may include the E-RAB ID(s) of the bearer(s) in the SeNB (SCG bearer or split bearer) into the "E-RABs Not Admitted List" IE contained in the Handover Request Acknowledge message. In this case, the S-MeNB 1 may release the SCG or change the SCG bearer (s) to the MCG bearer(s) before transmitting a handover command (i.e., RRC Connection Reconfiguration containing Mobility Control Info) to the UE 4 or after stopping (suspending) the handover.

Figure 4:
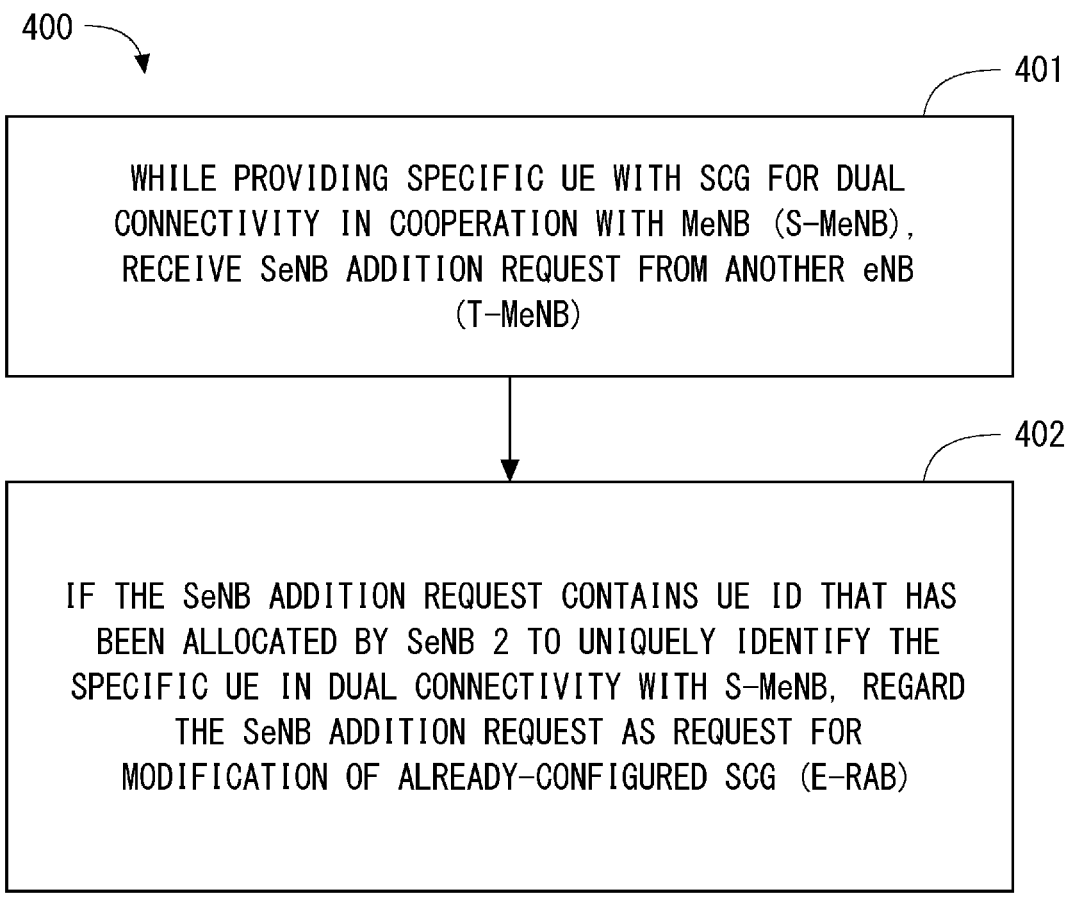
FIG. 4 is a flowchart showing an example of an operation of the SeNB according to the first embodiment.

FIG. 4 is a flowchart showing an example (operation 400) of the operation of the SeNB 2. In Block 401, while providing a specific UE 4 with an SCG for DC in cooperation with the MeNB (S-MeNB) 1, the SeNB 2 receives an SeNB Addition Request message from another eNB (T-MeNB) 3. In Block 402, if the SeNB Addition Request message (block 401) contains the UE ID (e.g., SeNB UE X2AP ID) that has been configured by the SeNB 2 to uniquely identify the specific UE 4 in DC with the S-MeNB 1, the SeNB 2 regards the SeNB Addition Request message as a request for modifying (changing) the already configured SCG (or SCG Config, or a bearer(s) (e.g., E-RAB(s))).

As can be understood from the above descriptions, according to the example described with reference to FIGS. 3 and 4, when the SeNB 2 receives an SeNB Addition Request message from another eNB (T-MeNB) 3 while providing the specific UE 4 with the SCG for DC in cooperation with the MeNB (S-MeNB) 1, the SeNB 2 is able to distinguish this SeNB Addition Request message from the existing (or normal) SeNB Addition Request message. Therefore, it is possible to avoid mistakenly determining that the SeNB Addition Request message received from the T-MeNB 3 is an error case and, accordingly, to avoid mistakenly ignoring this message or mistakenly releasing the SCG (or the bearer).

The SeNB 2 may further operate, upon receiving the SeNB Addition Request message from the T-MeNB 3, as follows. In some implementations, the SeNB 2 may be configured to, in response to sending the SeNB Addition Request Acknowledge message to the T-MeNB 3, replace the SCG configuration for DC in cooperation with the S-MeNB 1 with the modified (or newly configured) SCG configuration for DC in cooperation with the T-MeNB 3.

Alternatively, the SeNB 2 may be configured to, in response to receiving the SeNB Release Request message (Step 205) from the S-MeNB 1, replace the SCG configuration for DC in cooperation with the S-MeNB 1 with the modified (or newly configured) SCG configuration for DC in cooperation with the T-MeNB 3.

In some implementations, the SeNB 2 may be configured to, in response to receiving the SeNB Addition Request message from the T-MeNB 3, stop either or both of the transmission and reception of user data to and from the UE 4.

Second Embodiment

In the procedures shown in FIGS. 2A and 2B, the SeNB 2 has to distinguish the SeNB Release Request message from the S-MeNB 1 in Step 205 from the existing (or normal) SeNB Release Request message, and also has to distinguish the UE Context Release message from the S-MeNB 1 in Step 219 from the existing (or normal) UE Context Release message. This is because these SeNB Release Request and UE Context Release messages in Steps 205 and 219 allow the SeNB 2 to release only a part of the resources associated with the UE context of the UE 4. Thus, these SeNB Release Request and UE Context Release messages in Steps 205 and 219 have a different role from the existing (or normal) SeNB Release Request and UE Context Release messages.

This embodiment provides specific examples of operations of the S-MeNB 1, SeNB 2, and T-MeNB 3 and message structures to distinguish the SeNB Release Request message (Step 205) and UE Context Release message (Step 219) shown in FIGS. 2A and 2B from the existing (or normal) messages.

Figure 5:
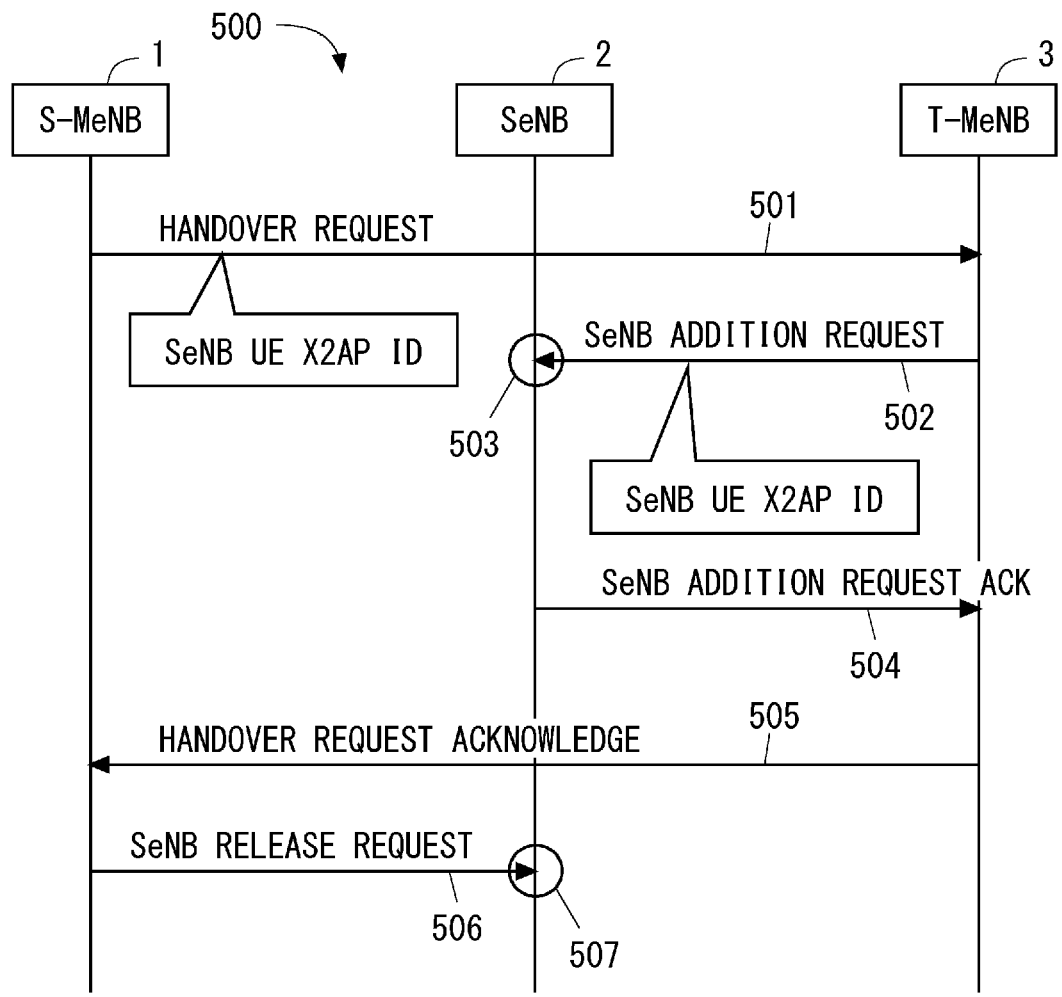
FIG. 5 is a sequence diagram for describing an operation of an SeNB according to a second embodiment.

FIG. 5 shows an example (procedure 500) of a procedure in which the SeNB 2 receives an SeNB Release Request message from the S-MeNB 1 after receiving an SeNB Addition Request message from the T-MeNB 3. Steps 501 to 504 shown in FIG. 5 are similar to Steps 301 to 304 shown in FIG. 3. Steps 505 and 506 shown in FIG. 5 correspond to Steps 204 and 205 shown in FIG. 2A. That is, in Step 505, the T-MeNB 3 sends, to the S-MeNB 1, a response message (i.e., Handover Request Acknowledge) indicating acceptance of the handover request received in Step 501.

In Step 506, in response to receiving the Handover Request Acknowledge message, the S-MeNB 1 sends an SeNB Release Request message to the SeNB 2. The SeNB Release Request message triggers the SeNB 2 to release resources (e.g., the UE context) regarding the UE 4 for the SeNB in DC with the S-MeNB 1.

In Step 507, upon receiving the SeNB Release Request message (Step 506) from the S-MeNB 1 after accepting the SeNB Addition Request (Step 502) from the T-MeNB 3, the SeNB 2 considers that a part of the resources associated with the UE context of the UE 4 can be released, but the rest of the resources should be kept.

In other words, if the SeNB 2 has accepted the SeNB Addition Request (Step 503) from the T-MeNB 3, which is regarded as a request to modify the SCG or a bearer(s) (E-RAB(s)) for DC for the UE 4, before receiving the SeNB Release Request message (Step 506) from the S-MeNB 1, the SeNB 2 considers that a part of the resources associated with the UE context of the UE 4 can be released, but the rest of the resources should be kept.

In other words, if the SeNB 2 is explicitly or implicitly notified, before receiving the SeNB Release Request message (Step 506) from the S-MeNB 1, by the T-MeNB 3 that the MeNB in DC for the UE 4 is to be changed from the S-MeNB 1 to the T-MeNB 3 (Step 502), the SeNB 2 considers that a part of the resources associated with the UE context of the UE 4 can be released, but the rest of the resources should be kept.

In some implementations, in response to receiving the SeNB Release Request message (Step 506) from the S-MeNB 1, the SeNB 2 may consider that a part of the radio resources and control plane resources associated with the UE context of the UE 4 can be released, but the rest of the resources should be kept. A part of the resources that can be released include, for example, one or more identifiers (e.g., MeNB UE X2AP ID allocated by the S-MeNB 1) of the inter-base station connection (i.e., X2 interface connection) between the S-MeNB 1 and the SeNB 2 associated with the UE 4. The rest of the resources that should not be released includes, for example, a bearer configuration in the SCG associated with the UE 4. The bearer configuration includes, for example, a bearer identifier(s) (e.g., E-RAB ID or eps-Bearer Identity, or DRB Identity, or a combination thereof), a logical channel configuration, and a Radio Link Control (RLC) configuration. The bearer configuration may be a bearer configuration that has been updated based on the SeNB Addition Request from the T-MeNB 3.

Additionally or alternatively, in some implementations, in response to receiving the SeNB Release Request message (Step 506) from the S-MeNB 1, the SeNB 2 may consider that a status regarding user data of the UE 4 should be kept even when data forwarding from the SeNB 2 to the S-MeNB 1 (or the T-MeNB 3) is not needed. The status regarding user data includes, for example, at least one of a Packet data Convergence Protocol (PDCP) status (e.g., PDCP SN and HFN) and a Radio Link Control (RLC) status regarding user data of the UE 4.

Figure 6:
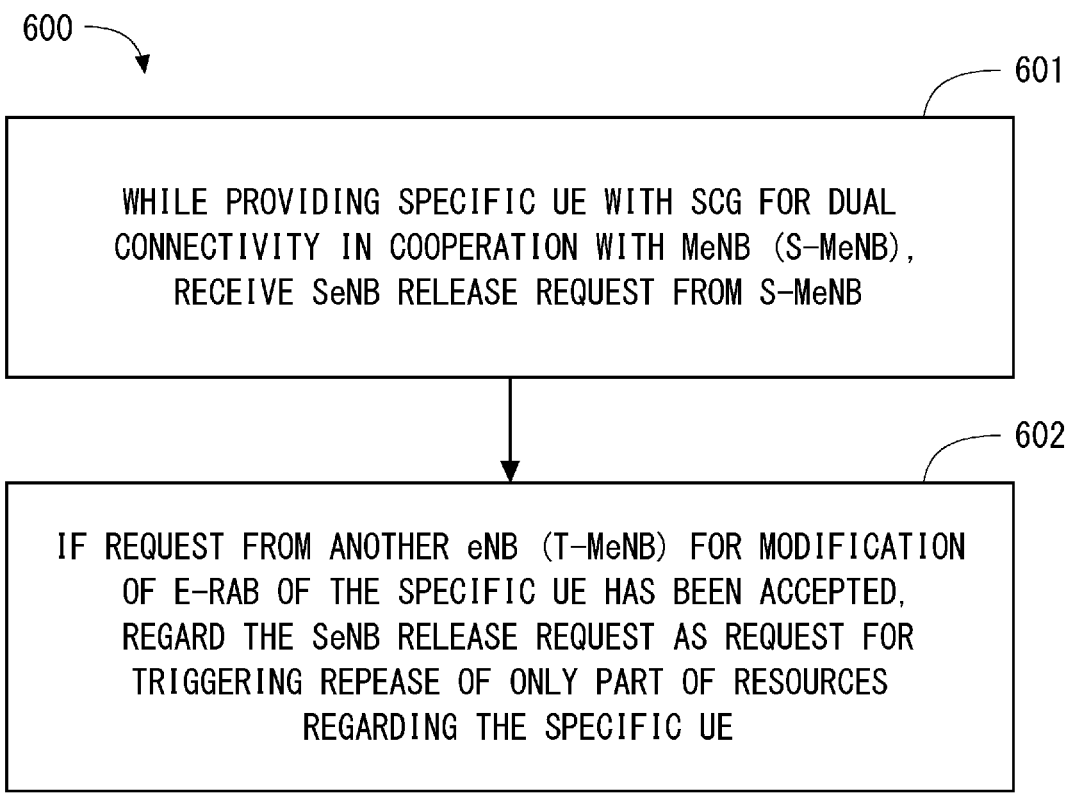
FIG. 6 is a flowchart for describing an operation of the SeNB according to the second embodiment.

FIG. 6 is a flowchart showing an example (process 600) of the operation of the SeNB 2. In Block 601, while providing a specific UE 4 with an SCG for DC in cooperation with the MeNB (S-MeNB) 1, the SeNB 2 receives an SeNB Release Request message from the S-MeNB 1. In Block 602, if the SeNB 2 has accepted an SeNB Addition Request from the T-MeNB 3, which is regarded as a request to modify (or change) the SCG or the bearer(s) (E-RAB(s)) for DC for the UE 4, before receiving the SeNB Release Request message (Step 601) from the S-MeNB 1, the SeNB 2 regards the SeNB Release Request message as a request for triggering release of only a part of the resources regarding the specific UE 4. For example, when an E-RAB To Be Released List IE contained in the received SeNB Release Request message includes a bearer identifier(s) (e.g., E-RAB ID) having the same value(s) as the bearer identifier(s) that has been requested to be added by the T-MeNB 3 (i.e., has been specified by the SeNB Addition Request message) and has been accepted by the SeNB 2 (i.e., the addition of which has been accepted by the SeNB 2), the SeNB 2 regards the SeNB Release message as a request for triggering release of only a part of the resources of the corresponding E-RAB(S) (regarding the UE 4).

As can be understood from the above descriptions, according to the example described with reference to FIGS. 5 and 6, when the SeNB 2 receives the SeNB Release Request message from the MeNB (S-MeNB) 1 while providing the specific UE 4 with the SCG for DC in cooperation with the S-MeNB 1, the SeNB 2 is able to determine resources that can be released upon the reception of the SeNB Release Request, based on whether the SeNB 2 has already accepted the SeNB Addition Request from the T-MeNB 3. Therefore, when the MeNB change (or inter-MeNB handover) is performed while the SeNB (or SCG or SCG bearer(s) (SCG bearer or split bearer)) is maintained, it is possible to avoid mistakenly releasing (or removing) resources which are to be used continuously for DC in cooperation with the T-MeNB 3.

Third Embodiment

Figure 7:
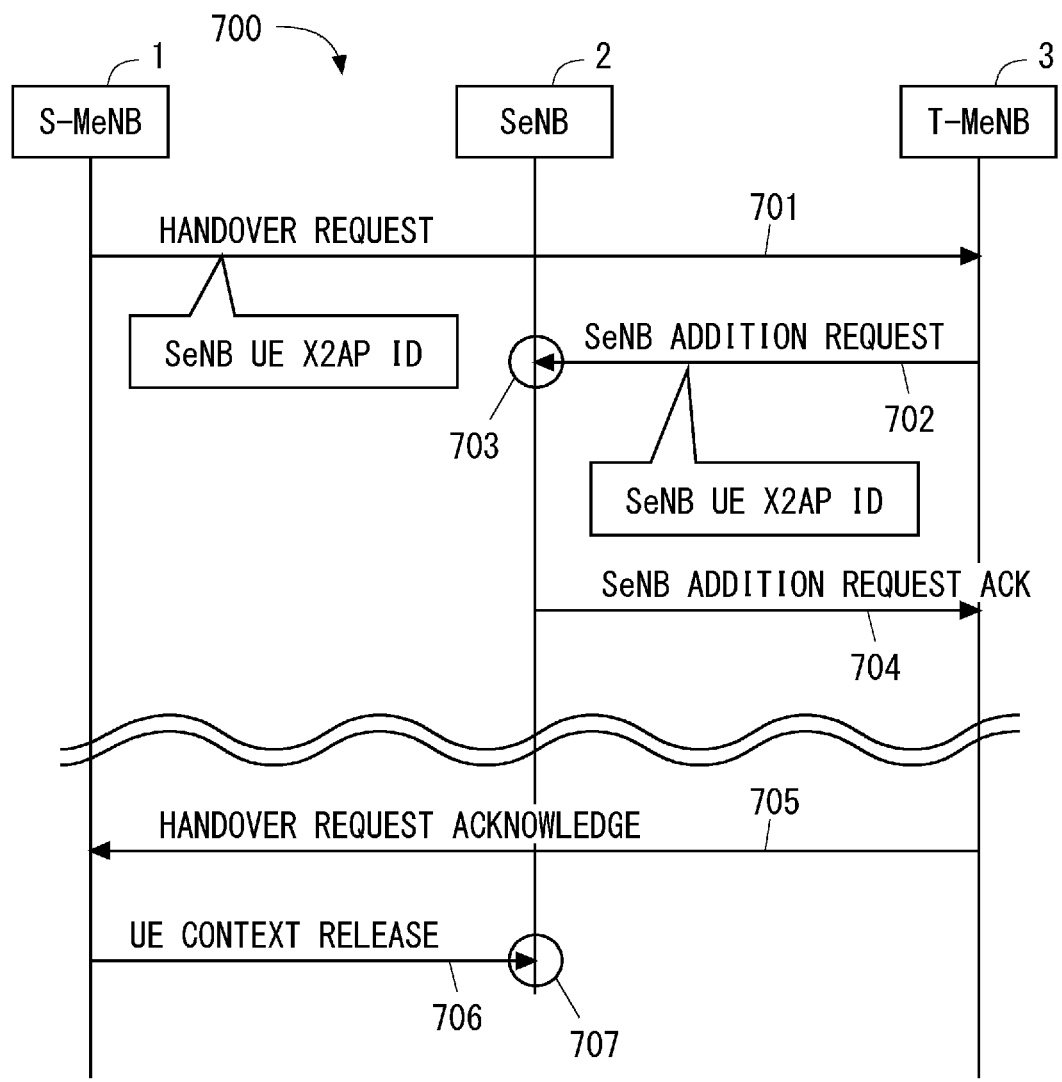
FIG. 7 is a sequence diagram for describing an operation of an SeNB according to a third embodiment.

This embodiment provides a modified example of the second embodiment. The procedure and operations described with reference to FIGS. 5 and 6 may be performed when the SeNB 2 receives the UE Context Release message from the S-MeNB 1 instead of, or in addition to, when the SeNB 2 receives the SeNB Release Request message from the S-MeNB 1. FIG. 7 shows an example (procedure 700) of a procedure in which the SeNB 2 receives an SeNB UE Context Release message from the S-MeNB 1 after receiving an SeNB Addition Request message from the T-MeNB 3. Steps 701 to 704 shown in FIG. 7 are similar to Steps 301 to 304 shown in FIG. 3, and also similar to Steps 501 to 504 shown in FIG. 5.

Steps 705 and 706 shown in FIG. 7 correspond to Steps 218 and 219 shown in FIG. 2B. That is, in Step 705, the T-MeNB 3 sends a Handover Request Acknowledge message to the S-MeNB 1. In Step 706, in response to receiving the Handover Request Acknowledge from the T-MeNB 3, the S-MeNB 1 sends an UE Context Release message to the SeNB 2.

In Step 707, if the SeNB 2 receives the UE Context Release message (Step 706) from the S-MeNB 1 after accepting the SeNB Addition Request (Step 702) from the T-MeNB 3, the SeNB 2 considers that a part of the resources associated with the UE context of the UE 4 can be released, but the rest of the resources should be kept.

In other words, if the SeNB 2 has accepted the SeNB Addition Request (Step 703) from the T-MeNB 3, which is regarded as a request to modify the SCG or the bearer(s) (E-RAB(s)) for DC for the UE 4, before receiving the UE Context Release message (Step 706) from the S-MeNB 1, the SeNB 2 considers that a part of the resources associated with the UE context of the UE 4 can be released, but the rest of the resources should be kept.

In other words, if the SeNB 2 is explicitly or implicitly notified, before receiving the UE Context Release message (Step 706) from the S-MeNB 1, by the T-MeNB 3 that the MeNB in DC for the UE 4 is to be changed from the S-MeNB 1 to the T-MeNB 3 (Step 702), the SeNB 2 considers that a part of the resources associated with the UE context of the UE 4 can be released, but the rest of the resources should be kept.

According to the example described with reference to FIG. 7, when the SeNB 2 receives the UE Context Release message from the MeNB (S-MeNB) 1 while providing the specific UE 4 with the SCG for DC in cooperation with the S-MeNB 1, the SeNB 2 is able to determine resources that can be released upon the reception of the UE Context Release message, based on whether the SeNB 2 has already accepted the SeNB Addition Request from the T-MeNB 3. Therefore, when the MeNB change (or inter-MeNB handover) is performed while the SeNB (or SCG or SCG bearer(s) (SCG bearer or split bearer)) is maintained, it is possible to avoid mistakenly releasing (or removing) resources which are to be used continuously for DC in cooperation with the T-MeNB 3.

In the example described with reference to FIGS. 5 and 6, the S-MeNB 1 may include, in the SeNB Release Request message or the UE Context Release message, an information element explicitly indicating that the MeNB in DC for the UE is to be changed from the S-MeNB 1 to the T-MeNB 3. Additionally or alternatively, the S-MeNB 1 may include, in the SeNB Release Request message or the UE Context Release message, an information element indicating the release of a part of the resources associated with the UE context of the UE 4 (i.e., partial SeNB Release Request or partial UE Context Release). Each of these information elements may be a Cause information element indicating a cause of the release message (i.e., SeNB Release Request message or UE Context Release message). For example, a new Cause value/Cause name indicating "Inter MeNB Handover", "Optimized Handover", or "Control plane release" may be defined. In this way, the SeNB 2 is able to easily distinguish the SeNB Release Request message or the UE Context Release message including these information elements from the existing (or normal) SeNB Release Request message or the UE Context Release message.

Figure 8:
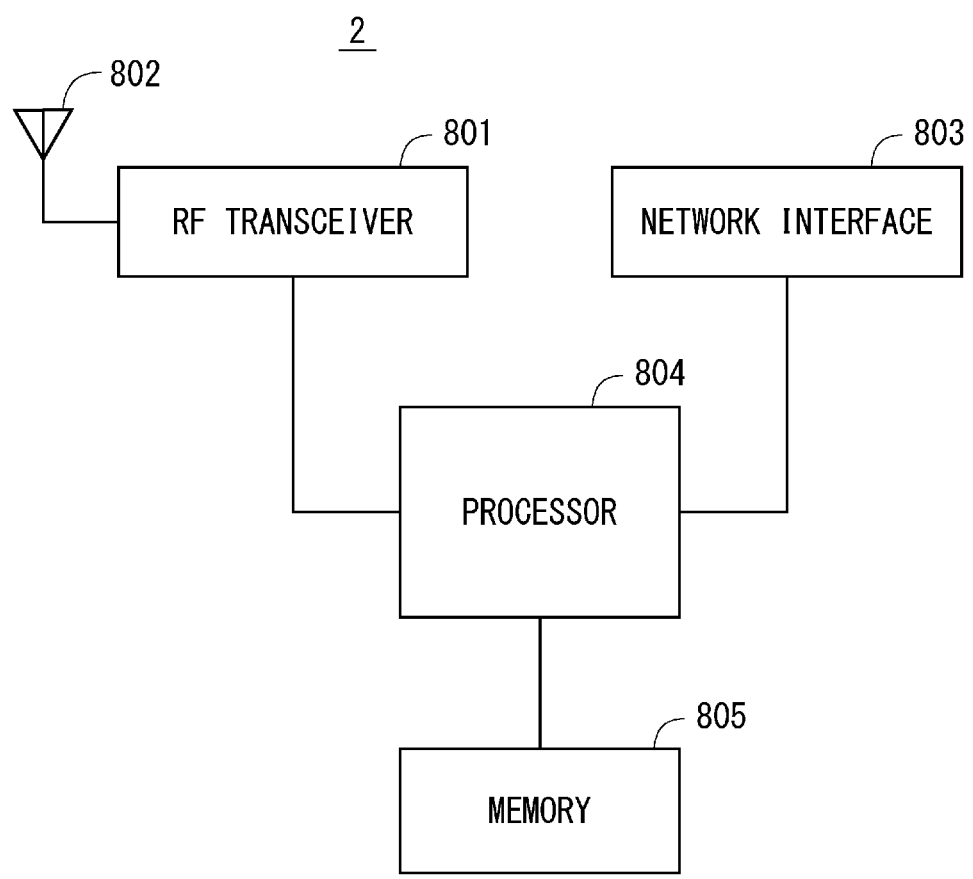
FIG. 8 is a block diagram showing a configuration example of a base station according to some embodiments.

Lastly, configuration examples of the eNB 1, eNB 2, eNB 3, and UE 4 according to the above-described embodiments will be described. FIG. 8 is a block diagram showing a configuration example of the SeNB 2. The S-MeNB 1 and the T-MeNB 3 each may have a configuration similar to the configuration show in FIG. 8. Referring to FIG. 8, the SeNB 2 includes an RF transceiver 801, a network interface 803, a processor 804, and a memory 805. The RF transceiver 801 performs analog RF signal processing to communicate with UEs. The RF transceiver 801 may include a plurality of transceivers. The RF transceiver 801 is coupled to an antenna 802 and a processor 804. The RF transceiver 801 receives modulation symbol data (or OFDM symbol data) from the processor 804, generates a transmission RF signal, and supplies the transmission RF signal to the antenna 802. Moreover, the RF transceiver 801 generates a baseband reception signal based on a reception RF signal received by the antenna 802, and supplies the baseband reception signal to the processor 804.

The network interface 803 is used to communicate with network nodes (e.g., other eNBs, MMEs, and S-GWs). The network interface 803 may include, for example, a network interface card (NIC) conforming to the IEEE 802.3 series.

The processor 804 performs digital baseband signal processing (i.e., data plane processing) and control plane processing for radio communication. For example, in the case of LTE and LTE-Advanced, the digital baseband signal processing performed by the processor 804 may include signal processing of the PDCP layer, RLC layer, MAC layer, and PHY layer. Further, signal processing performed by the processor 804 may include signal processing of the GTP-U UDP/IP layer for the X2-U and S1-U interfaces. Further, the control plane processing performed by the processor 804 may include processing of the X2AP protocol, S1-MME protocol, and RRC protocol.

The processor 804 may include a plurality of processors. The processor 804 may include, for example, a modem processor (e.g., DSP) that performs the digital baseband signal processing, a processor (e.g., DSP) that performs the signal processing of the GTP-U UDP/IP layer for the X2-U and S1-U interfaces, and a protocol stack processor (e.g., CPU or MPU) that performs the control plane processing.

The memory 805 is composed of a combination of a volatile memory and a non-volatile memory. The memory 805 may include a plurality of physically independent memory devices. The volatile memory is, for example, Static Random Access Memory (SRAM), Dynamic RAM (DRAM) or a combination thereof. The non-volatile memory may be a Mask Read Only Memory (MROM), an Electrically Erasable Programmable ROM (EEPROM), a flash memory, a hard disk drive, or any combination thereof. The memory 805 may include a storage disposed separately from the processor 804. In this case, the processor 804 may access the memory 805 via the network interface 803 or a not illustrated I/O interface.

The memory 805 may store a software module(s) (computer program(s)) including instructions and data for processing by the SeNB 2 described in the above embodiments. In some implementations, the processor 804 may be configured to load the software module(s) from the memory 805 and execute the loaded software module(s), thereby performing the processing of the SeNB 2 described in the above embodiments.

Figure 9:
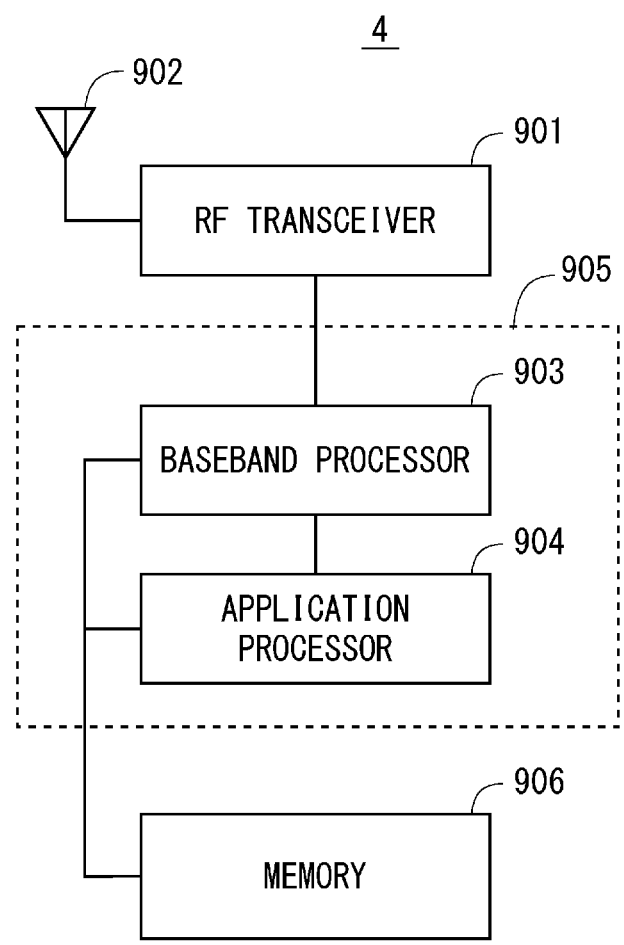
FIG. 9 is a block diagram showing a configuration example of a radio terminal according to some embodiments.

FIG. 9 is a block diagram showing a configuration example of the UE 4 according to the above embodiments. A Radio Frequency (RF) transceiver 901 performs analog RF signal processing to communicate with the eNB 2. The analog RF signal processing performed by the RF transceiver 901 includes frequency up-conversion, frequency down-conversion, and amplification. The RF transceiver 901 is coupled to an antenna 902 and a baseband processor 903. That is, the RF transceiver 901 receives modulation symbol data (or OFDM symbol data) from the baseband processor 903, generates a transmission RF signal, and supplies the transmission RF signal to the antenna 902. Moreover, the RF transceiver 901 generates a baseband reception signal based on a reception RF signal received by the antenna 902, and supplies the baseband reception signal to the baseband processor 903.

The baseband processor 903 performs digital baseband signal processing (i.e., data plane processing) and control plane processing for radio communication. The digital baseband signal processing includes (a) data compression/decompression, (b) data segmentation/concatenation, (c) generation/decomposition of a transmission format (transmission frame), (d) transmission channel coding/decoding, (e) modulation (symbol mapping)/demodulation, (f) generation of OFDM symbol data (baseband OFDM signal) by Inverse Fast Fourier Transform (IFFT), and the like. On the other hand, the control plane processing includes communication management in the layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE and LTE-Advanced, the digital baseband signal processing performed by the baseband processor 903 may include signal processing in the Packet Data Convergence Protocol (PDCP) layer, Radio Link Control (RLC) layer, MAC layer, and PHY layer. Further, the control plane processing by the baseband processor 903 may include the processing of the Non-Access Stratum (NAS) protocol, RRC protocol, and MAC CE.

The baseband processor 903 may include a modem processor (e.g., Digital Signal Processor (DSP)) that performs the digital baseband signal processing and a protocol stack processor (e.g., Central Processing Unit (CPU) or Micro Processing Unit (MPU)) that performs the control plane processing. In this case, the protocol stack processor that performs the control plane processing may be integrated with an application processor 904 described in the following.

The application processor 904 is also referred to as a CPU, an MPU, a microprocessor, or a processor core. The application processor 904 may include a plurality of processors (a plurality of processor cores). The application processor 904 loads a system software program (Operating System (OS)) and various application programs (e.g., a call application, a WEB browser, a mailer, a camera operation application, a music playback application) from a memory 906 or from another memory (not shown) and executes these programs, thereby providing various functions of the UE 4.

In some implementations, as indicated by the dashed line (905) in FIG. 9, the baseband processor 903 and the application processor 904 may be integrated on a single chip. In other words, the baseband processor 903 and the application processor 904 may be implemented in one System on Chip (SoC) device 905. A SoC device is sometimes referred to as a system Large Scale Integration (LSI) or a chipset.

The memory 906 is a volatile memory or a non-volatile memory or a combination thereof. The memory 906 may include a plurality of physically independent memory devices. The volatile memory is, for example, Static Random Access Memory (SRAM), Dynamic RAM (DRAM) or a combination thereof. The non-volatile memory may be a Mask Read Only Memory (MROM), an Electrically Erasable Programmable ROM (EEPROM), a flash memory, a hard disk drive, or any combination thereof. The memory 906 may include an external memory device accessible from the baseband processor 903, the application processor 904, and the SoC 905. The memory 906 may include an internal memory device integrated within the baseband processor 903, the application processor 904, or the SoC 905. The memory 906 may further include a memory in a Universal Integrated Circuit Card (UICC).

The memory 906 may store a software module(s) (computer program(s)) including instructions and data for processing by the UE 4 described in the above embodiments. In some implementations, the baseband processor 903 or the application processor 904 may be configured to load the software module(s) from the memory 906 and execute the loaded software module(s), thereby performing the processing of the remote UE 4 described in the above embodiments.

As described with reference to FIGS. 8 and 9, each of the processors included in the eNB 1, eNB 2, eNB 3, and UE 4 according to the above-described embodiments executes one or more programs including instructions for causing a computer to perform the algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory (RAM)). These programs can be stored and provided to a computer using any type of transitory computer readable media. Examples of transitory computer readable media include electric signals, optical signals, and electromagnetic waves. Transitory computer readable media can provide programs to a computer via a wired communication line (e.g. electric wires, and optical fibers) or a wireless communication line.

Other Embodiments

The descriptions of the above-described embodiments mainly focus on LTE/LTE-Advanced and extensions thereof. However, the above-described embodiments may be applied to other radio communication networks or systems. Each of the eNBs 1 to 3 described in the above embodiments can also be referred to as a radio station. The radio station in this specification may include a control node having a radio resource management function (e.g., Radio Network Controller (RNC) in UMTS or Base Station Controller (BSC) in GSM System) and a radio transmission node (e.g., NodeB in UMTS, or base transceiver station (BTS) in the GSM system).

Further, the above-described embodiments are merely examples of applications of the technical ideas obtained by the inventors. The technical ideas are not limited to the above-described embodiments, and various changes and modifications may be made thereto.

For example, the whole or part of the embodiments disclosed above can be described as, but not limited to, the following supplementary notes.

Supplementary Note A1

A base station apparatus comprising:
at least one radio transceiver; and
at least one processor coupled to the at least one radio transceiver, wherein
the at least one processor is configured to, upon receiving an SeNB addition request message from a second master base station while the base station apparatus provides a radio terminal with a secondary cell group (SCG) for dual connectivity in cooperation with a first master base station, if the SeNB addition request message includes a first information element explicitly or implicitly indicating that a master base station in the dual connectivity for the radio terminal is to be changed from the first master base station to the second master base station, consider that the SeNB addition request message requests modification of a configuration regarding the SCG.

Supplementary Note A2

The base station apparatus according to Supplementary note A1, wherein the first information element includes a radio terminal identifier in order to implicitly indicate the change of the master base station in the dual connectivity for the radio terminal, wherein
the radio terminal identifier is an identifier that is allocated by the base station apparatus and is used to uniquely identify the radio terminal on an inter-base station interface between the first master base station and the base station apparatus.

Supplementary Note A3

The base station apparatus according to Supplementary note A2, wherein the radio terminal identifier includes an SeNB UE X2AP ID allocated by the base station apparatus.

Supplementary Note A4

The base station apparatus according to Supplementary note A2 or A3, wherein the first information element further includes a bearer identifier of a network bearer that is already configured in the base station apparatus for the dual connectivity in cooperation with the first master base station.

Supplementary Note A5

The base station apparatus according to Supplementary note A1, wherein the first information element explicitly indicates that the master base station in the dual connectivity for the radio terminal is to be changed from the first master base station to the second master base station.

Supplementary Note A6

The base station apparatus according to Supplementary note A5, wherein the SeNB addition request message includes information specifying a combination of an identifier of a network bearer and a bearer identifier of a data radio bearer that are already configured in the base station apparatus for the dual connectivity in cooperation with the first master base station.

Supplementary Note A7

The base station apparatus according to any one of Supplementary notes A1 to A6, wherein the at least one processor is configured to, in response to sending a response message to the SeNB addition request message to the second master base station, replace an SCG configuration for the dual connectivity in cooperation with the first master base station with a modified or newly-configured SCG configuration for dual connectivity in cooperation with the second master base station.

Supplementary Note A8

The base station apparatus according to any one of Supplementary notes A1 to A6, wherein the at least one processor is configured to, in response to receiving an SCG release request message from the first master base station, replace an SCG configuration for the dual connectivity in cooperation with the first master base station with a modified SCG configuration for dual connectivity in cooperation with the second master base station.

Supplementary Note A9

The base station apparatus according to any one of Supplementary notes A1 to A8, wherein the at least one processor is configured to, in response to receiving the SeNB addition request message from the second master base station, suspend one or both of transmission and reception of user data to and from the radio terminal.

Supplementary Note A10

The base station apparatus according to any one of Supplementary notes A1 to A9, wherein the at least one processor is configured to, after accepting the SeNB addition request message from the second master base station, upon receiving from the first master base station a release message to trigger release of a context of the radio terminal for the dual connectivity, consider that a part of radio resources and control-plane resources associated with the context of the radio terminal can be released, but the rest of the radio resources and control-plane resources should be kept.

Supplementary Note A11

The base station apparatus according to Supplementary note A10, wherein the part of the resources includes one or more identifiers of an inter-base station interface connection between the first master base station and the base station apparatus associated with the radio terminal.

Supplementary Note A12

The base station apparatus according to Supplementary note A10 or A11, wherein the rest of the resources includes a configuration of a bearer associated with the radio terminal.

Supplementary Note A13

The base station apparatus according to Supplementary note A12, wherein the configuration of the bearer includes an identifier of the bearer, a logical channel configuration, and a Radio Link Control (RLC) configuration.

Supplementary Note A14

The base station apparatus according to Supplementary note A12 or A13, wherein the configuration of the bearer has been updated based on the SeNB addition request from the second master base station.

Supplementary Note A15

The base station apparatus according to any one of Supplementary notes A1 to A14, wherein the at least one processor is configured to, after accepting the SeNB addition request message from the second master base station, upon receiving from the first master base station a release message to trigger release of a context of the radio terminal for the dual connectivity, consider that a status regarding user data of the radio terminal should be kept even when data forwarding from the base station apparatus to the first or second master base station is not needed.

Supplementary Note A16

The base station apparatus according to Supplementary note A15, wherein the status regarding the user data includes at least one of: a Packet data Convergence Protocol (PDCP) status regarding the user data of the radio terminal; and a Radio Link Control (RLC) status regarding the user data of the radio terminal.

Supplementary Note A17

The base station apparatus according to any one of Supplementary notes A10 to A16, wherein the release message is an SCG release request message indicating release of the SCG or a context release message indicating release of the context of the radio terminal.

Supplementary Note A18

The base station apparatus according to any one of Supplementary notes A10 to A17, wherein the release message includes one or both of: a second information element that explicitly indicates that the master base station in the dual connectivity for the radio terminal is to be changed from the first master base station to the second master base station; and a third information element that indicates partial release of resources associated with the context of the radio terminal.

Supplementary Note A19

The base station apparatus according to Supplementary note A18, wherein at least one of the second information element and the third information element includes a Cause information element indicating a cause of the release message.

Supplementary Note B1

A base station apparatus comprising:
at least one radio transceiver; and
at least one processor coupled to the at least one radio transceiver, wherein
the at least one processor is configured to, while providing a radio terminal with a secondary cell group (SCG) for dual connectivity in cooperation with a first master base station, receive from the first master base station a release message to trigger release of a context of the radio terminal for the dual connectivity, and
the at least one processor is configured to, upon receiving the release message, if the at least one processor is explicitly or implicitly notified, before receiving the release message, by the second master base station that a master base station in the dual connectivity for the radio terminal is to be changed from the first master base station to the second master base station, consider that a part of radio resources and control-plane resources associated with the context of the radio terminal can be released, but the rest of the radio resources and control-plane resources should be kept.

Supplementary Note B2

The base station apparatus according to Supplementary note B1, wherein the part of the resources include one or more identifiers of an inter-base station interface connection between the first master base station and the base station apparatus associated with the radio terminal.

Supplementary Note B3

The base station apparatus according to Supplementary note B1 or B2, wherein the rest of the resources include a configuration of a bearer associated with the radio terminal.

Supplementary Note B4

The base station apparatus according to Supplementary note B3, wherein the configuration of the bearer includes an identifier of the bearer, a logical channel configuration, and a Radio Link Control (RLC) configuration.

Supplementary Note B5

The base station apparatus according to Supplementary note B3 or B4, wherein the configuration of the bearer has been updated based on the SeNB addition request from the second master base station.

Supplementary Note B6

A base station apparatus comprising:
at least one radio transceiver; and
at least one processor coupled to the at least one radio transceiver, wherein
the at least one processor is configured to, while providing a radio terminal with a secondary cell group (SCG) for dual connectivity in cooperation with a first master base station, receive from the first master base station a release message to trigger release of a context of the radio terminal for the dual connectivity, and
the at least one processor is configured to, upon receiving the release message, if the at least one processor is explicitly or implicitly notified, before receiving the release message, by the second master base station that a master base station in the dual connectivity for the radio terminal is to be changed from the first master base station to the second master base station, consider that a status regarding user data of the radio terminal should be kept even when data forwarding to the first or second master base station is not needed.

Supplementary Note B7

The base station apparatus according to Supplementary note B6, wherein the status regarding the user data includes at least one of a Packet data Convergence Protocol (PDCP) status and a Radio Link Control (RLC) status regarding the user data of the radio terminal.

Supplementary Note B8

The base station apparatus according to any one of Supplementary notes B1 to B7, wherein the release message is an SCG release request message indicating release of the SCG or a context release message indicating release of a context regarding the radio terminal.

Supplementary Note B9

The base station apparatus according to any one of Supplementary notes B1 to B8, wherein the release message includes one or both of: a second information element that explicitly indicates that the master base station in the dual connectivity for the radio terminal is to be changed from the first master base station to the second master base station; and a third information element that indicates partial release of radio resources and control-plane resources associated with the context of the radio terminal.

Supplementary Note B10

The base station apparatus according to Supplementary note B9, wherein at least one of the second information element and the third information includes a Cause information element indicating a cause of the release message.

The present application is based upon and claims the benefit of priority from Japanese Patent Application No. 2015-152735, filed on Jul. 31, 2015, the entire contents of which are hereby incorporated by reference.

REFERENCE SIGNS LIST 1-3 BASE STATIONS (eNBs)
4 RADIO TERMINAL (UE)
801 RF TRANSCEIVER
804 PROCESSOR
805 MEMORY

The invention claimed is:

1. A Secondary Radio Access Network (RAN) node comprising:
 at least one memory storing instructions; and
 at least one processor configured to process the instructions to:
  operate a Secondary Cell Group (SCG);
  communicate with a radio terminal configured to perform dual connectivity using the SCG and a Master Cell Group (MCG) operated by a first Master RAN node;
  receive from a second Master RAN node, during a handover procedure from the first Master RAN node to the second Master RAN node, a Secondary RAN Node Addition Request message including a radio terminal identifier of the radio terminal allocated by the Secondary RAN node and used over an interface between the first Master RAN node and the Secondary RAN node; and
  reject a Secondary RAN Node Addition Request procedure corresponding to the Secondary RAN Node Addition Request message by using a Secondary RAN Node Addition Reject message, in a case where the radio terminal identifier included in the Secondary RAN Node Addition Request message is not used to uniquely identify the radio terminal in the Secondary RAN node, wherein
 the Secondary RAN Node Addition Reject message includes a cause indicating that the radio terminal identifier included in the Secondary RAN Node Addition Request message is not appropriate, and
 wherein the radio terminal identifier includes a Secondary RAN Node UE X2AP ID.

2. The Secondary RAN node according to claim 1, wherein
 the radio terminal identifier is an identifier that is used to uniquely identify the radio terminal on the interface between the first Master RAN node and the Secondary RAN Node.

3. The Secondary RAN node according to claim 2, wherein the radio terminal identifier implicitly indicates a change of a master RAN node in the dual connectivity for the radio terminal.

4. The Secondary RAN node according to claim 1, wherein the at least one processor is configured to, in response to receiving a Secondary RAN Node Release Request message from the first Master RAN node in a case where the radio terminal identifier included in the Secondary RAN node Addition Request message matches the radio terminal identifier allocated to the radio terminal in the Secondary RAN node, replace an SCG configuration for the dual connectivity in cooperation with the first Master RAN node with a modified SCG configuration for dual connectivity in cooperation with the second Master RAN node.

5. A method in a Secondary Radio Access Network (RAN) node, the method comprising:
 receiving a Secondary RAN node Addition Request message from a second Master RAN node, during a handover procedure from the first Master RAN node to the second Master RAN node, the Secondary RAN node Addition Request message including a radio terminal identifier of the radio terminal allocated by the Secondary RAN node and used over an interface between the first Master RAN node and the Secondary RAN node; and
 transmitting a Secondary RAN Node Addition Reject message to reject a Secondary RAN Node Addition Request procedure corresponding to the Secondary RAN Node Addition Request message, in a case where the radio terminal identifier included in the Secondary RAN node Addition Request message is not used to uniquely identify the radio terminal in the Secondary RAN node, wherein
 the Secondary RAN Node Addition Reject message includes a cause indicating that the radio terminal identifier included in the Secondary RAN Node Addition Request message is not appropriate, and
 wherein the radio terminal identifier includes a Secondary RAN Node UE X2AP ID.

6. The method according to claim 5, wherein the radio terminal identifier is an identifier that is used to uniquely identify the radio terminal on the interface between the first Master RAN node and the Secondary RAN Node.

7. The method according to claim 6, wherein the radio terminal identifier implicitly indicates a change of a master RAN node in the dual connectivity for the radio terminal.

8. The method according to claim 5, further comprising replacing an SCG configuration for the dual connectivity in cooperation with the first Master RAN node with a modified SCG configuration for dual connectivity in cooperation with the second Master RAN node, in response to receiving a Secondary RAN node Release Request message from the first Master RAN node in a case where the radio terminal identifier included in the Secondary RAN node Addition Request message matches the radio terminal identifier allocated to the radio terminal in the Secondary RAN node.

9. A radio terminal comprising:
 at least one radio transceiver to communicate with a first Master Radio Access Network (RAN) node, a second Master RAN node, and a Secondary RAN Node; and at least one processor configured to communicate with the first Master RAN node and the second Master RAN node and to change a master RAN node in the dual connectivity from the first Master RAN node to the second Master RAN node while keeping a connection to a Secondary Cell Group (SCG) in the secondary RAN node, wherein the Secondary RAN Node is configured to:
  receive from the second Master RAN node, during a handover procedure from the first Master RAN node to the second Master RAN node, a Secondary RAN node Addition Request message including a radio terminal identifier of the radio terminal allocated by the Secondary RAN node and used over an interface between the first Master RAN node and the Secondary RAN node; and
  reject the Secondary RAN node Addition Request message by using a Secondary RAN Node Addition Reject message, in a case where the radio terminal identifier included in the Secondary RAN node Addition Request message is not used to uniquely identify the radio terminal in the Secondary RAN node, wherein
the Secondary RAN Node Addition Reject message includes a cause indicating that the radio terminal identifier included in the Secondary RAN Node Addition Request message is not appropriate, and
  wherein the radio terminal indentifier includes a Secondary RAN Node UE X2AP ID.

10. The radio terminal according to claim 9, wherein the radio terminal identifier is an identifier that is used to uniquely identify the radio terminal on the interface between the first Master RAN node and the Secondary RAN Node.

11. The radio terminal according to claim 10, wherein the radio terminal identifier implicitly indicates a change of a master RAN node in the dual connectivity for the radio terminal.

12. The radio terminal according to claim 9, wherein the Secondary RAN Node is configured to, in response to receiving a Secondary RAN node Release Request message from the first Master RAN node in a case where the radio terminal identifier included in the Secondary RAN node Addition Request message matches the radio terminal identifier allocated to the radio terminal in the Secondary RAN node, replace an SCG configuration for the dual connectivity in cooperation with the first Master RAN node with a modified SCG configuration for dual connectivity in cooperation with the second Master RAN node.

* * * * *

UNITED STATES PATENT AND TRADEMARK OFFICE
CERTIFICATE OF CORRECTION

PATENT NO. : 10,638,377 B2
APPLICATION NO. : 15/741641
DATED : April 28, 2020
INVENTOR(S) : Futaki et al.

It is certified that error appears in the above-identified patent and that said Letters Patent is hereby corrected as shown below:

In the Claims

At Column 26, Claim number 9, in the middle of Line number 3, should read:
--wherein the radio terminal identifier includes--

Signed and Sealed this
Thirty-first Day of May, 2022

Katherine Kelly Vidal
*Director of the United States Patent and Trademark Office*